United States Patent
Roschelle et al.

(10) Patent No.: US 8,092,227 B2
(45) Date of Patent: Jan. 10, 2012

(54) METHOD AND APPARATUS FOR GROUP LEARNING VIA SEQUENTIAL EXPLANATION TEMPLATES

(75) Inventors: Jeremy Roschelle, Palo Alto, CA (US); William Penuel, San Francisco, CA (US)

(73) Assignee: SRI International, Menlo Park, CA (US)

( * ) Notice: Subject to any disclaimer, the term of this patent is extended or adjusted under 35 U.S.C. 154(b) by 1298 days.

(21) Appl. No.: 10/611,665

(22) Filed: Jul. 1, 2003

(65) Prior Publication Data

US 2004/0072136 A1 Apr. 15, 2004

Related U.S. Application Data

(63) Continuation-in-part of application No. 09/792,160, filed on Feb. 21, 2001, now Pat. No. 6,628,918.

(60) Provisional application No. 60/398,692, filed on Jul. 25, 2002.

(51) Int. Cl.
*G09B 7/00* (2006.01)
*G09B 3/00* (2006.01)

(52) U.S. Cl. ......... 434/322; 434/323; 434/350; 434/362

(58) Field of Classification Search .......... 434/350, 434/171, 172, 176, 164, 178, 362, 118, 322, 434/323
See application file for complete search history.

(56) References Cited

U.S. PATENT DOCUMENTS

| | | | |
|---|---|---|---|
| 4,764,120 A | 8/1988 | Griffin et al. | 434/336 X |
| 4,958,284 A * | 9/1990 | Bishop et al. | 434/353 |
| 5,002,491 A | 3/1991 | Abrahamson et al. | 434/322 X |
| 5,273,437 A | 12/1993 | Caldwell et al. | 434/351 X |
| 5,465,384 A | 11/1995 | Bejan et al. | 455/2 X |
| 5,565,316 A * | 10/1996 | Kershaw et al. | 434/322 |
| 5,608,872 A | 3/1997 | Schwartz et al. | 709/205 |
| 5,649,104 A | 7/1997 | Carleton et al. | 709/204 |
| 5,717,856 A | 2/1998 | Carleton et al. | 709/205 |
| 5,727,950 A | 3/1998 | Cook et al. | 434/350 |
| 5,761,419 A | 6/1998 | Schwartz et al. | 709/204 |
| 5,781,727 A | 7/1998 | Carleton et al. | 709/205 |
| 5,819,038 A | 10/1998 | Carleton et al. | 709/204 |
| 5,823,788 A | 10/1998 | Lemelson et al. | 434/350 X |
| 5,838,914 A | 11/1998 | Carleton et al. | 709/204 |
| 5,920,694 A | 7/1999 | Carleton et al. | 709/205 |
| 5,948,022 A | 9/1999 | Carleton et al. | 700/204 |
| 6,052,512 A | 4/2000 | Peterson et al. | 709/220 X |
| 6,061,717 A | 5/2000 | Carleton et al. | 709/205 |
| 6,070,145 A | 5/2000 | Pinsley et al. | 705/10 X |

(Continued)

FOREIGN PATENT DOCUMENTS

EP 0 622 931 11/1994

OTHER PUBLICATIONS

National Semiconductor Whitepaper, "Thin-Client Computing: Competitive Edge for Retail and Banking Sectors" (Nov. 2000).

(Continued)

*Primary Examiner* — Xuan Thai
*Assistant Examiner* — Jerry-Daryl Fletcher

(57) ABSTRACT

Method and system for assessing a student's understanding of a process that may unfold, e.g., overtime and space. The present invention provides a sophisticated approach of directing students to perform self-explanation, and enables instructors to enhance the value of this pedagogical process by providing meaningful and rapid feedback in a classroom setting.

75 Claims, 15 Drawing Sheets

U.S. PATENT DOCUMENTS

| | | | |
|---|---|---|---|
| 6,074,216 A | 6/2000 | Cueto | 434/322 X |
| 6,099,319 A | 8/2000 | Zaltman et al. | 434/236 |
| 6,155,840 A | 12/2000 | Sallette | 434/323 X |
| 6,195,687 B1 | 2/2001 | Greaves et al. | 709/208 X |
| 6,208,832 B1 | 3/2001 | Remschel | 434/350 X |
| 6,250,930 B1 | 6/2001 | Mintz | 434/323 X |
| 6,287,125 B1 | 9/2001 | Dorcely | 434/323 X |
| 6,289,222 B1 | 9/2001 | Cue et al. | 434/458 X |
| 6,302,698 B1 * | 10/2001 | Ziv-El | 434/323 |
| 6,325,632 B1 | 12/2001 | Chao et al. | 434/322 X |
| 6,341,316 B1 | 1/2002 | Kloba et al. | 709/248 |
| 6,356,939 B1 | 3/2002 | Dahl | 709/209 X |
| 6,377,781 B1 | 4/2002 | Mishkin | 434/350 X |
| 6,381,444 B1 | 4/2002 | Aggarwal et al. | 434/350 X |
| 6,397,036 B1 | 5/2002 | Thean et al. | 434/350 X |
| 6,418,298 B1 * | 7/2002 | Sonnenfeld | 434/350 |
| 6,449,632 B1 | 9/2002 | David et al. | 709/202 X |
| 6,554,618 B1 * | 4/2003 | Lockwood | 434/322 |
| 6,856,318 B1 * | 2/2005 | Lewak | 345/473 |
| 7,240,016 B1 * | 7/2007 | Sturgis et al. | 705/4 |
| 2001/0052122 A1 * | 12/2001 | Nanos et al. | 725/9 |
| 2002/0002627 A1 | 1/2002 | Stead et al. | 709/250 |

OTHER PUBLICATIONS

Virtual Network Computing form AT&T Laboratories Cambridge (2 pages) [on-line], University of Cambridge, Department of Engineering [retrieved on Jun. 18, 2002]. Retrieved from the Internet: http://www.uk.research.att.com/vnc/index.html.

Palm VNC—remote access and collaboration client for Palm Platform (7 pages), [on-line] International Computer Science Institute (ICSI) [retrieved on Jun. 18, 2002] Retrieved from the Internet: http://www.icsi.berkeley.edu/~minenko/PalmVNC/>.

* cited by examiner

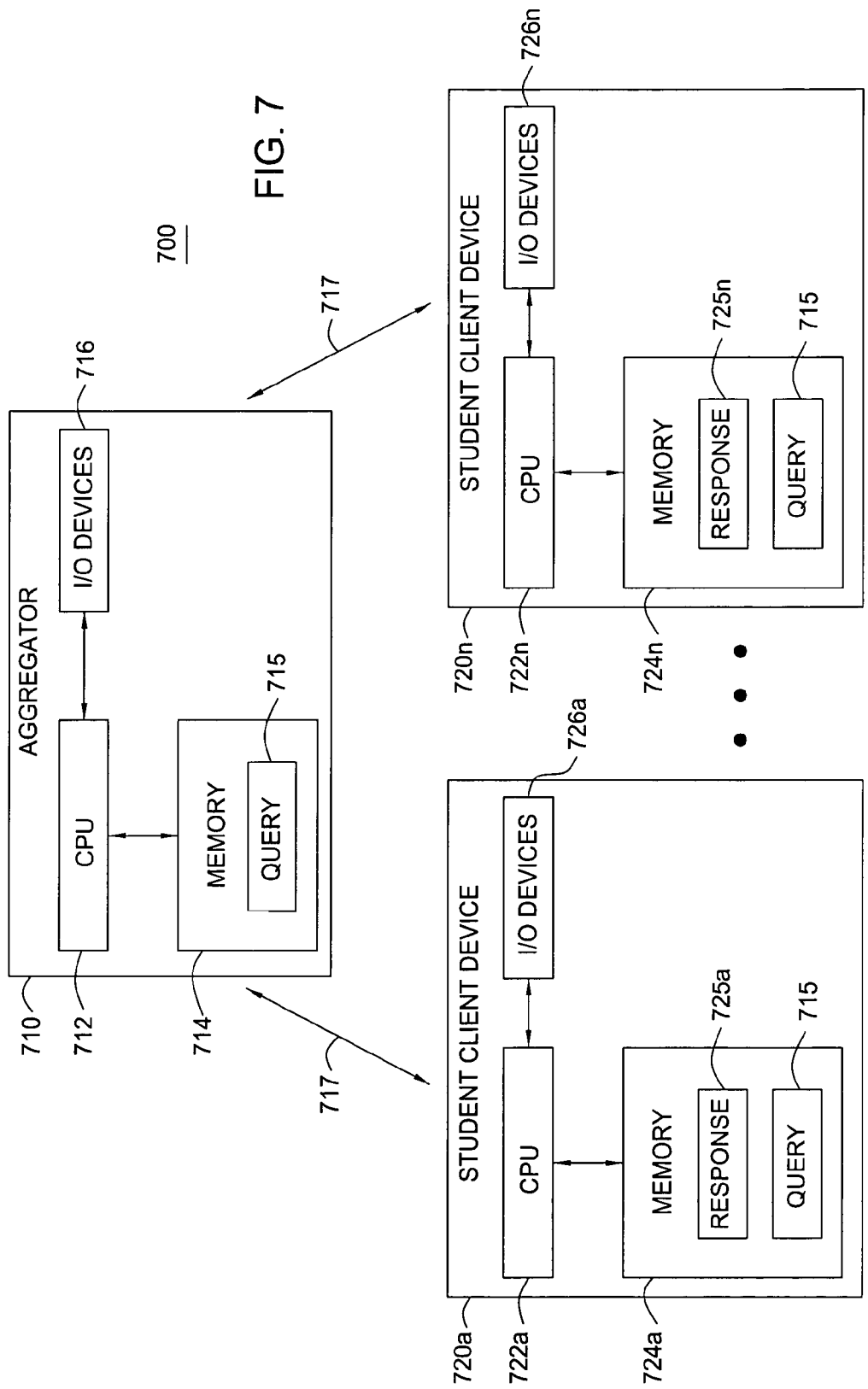

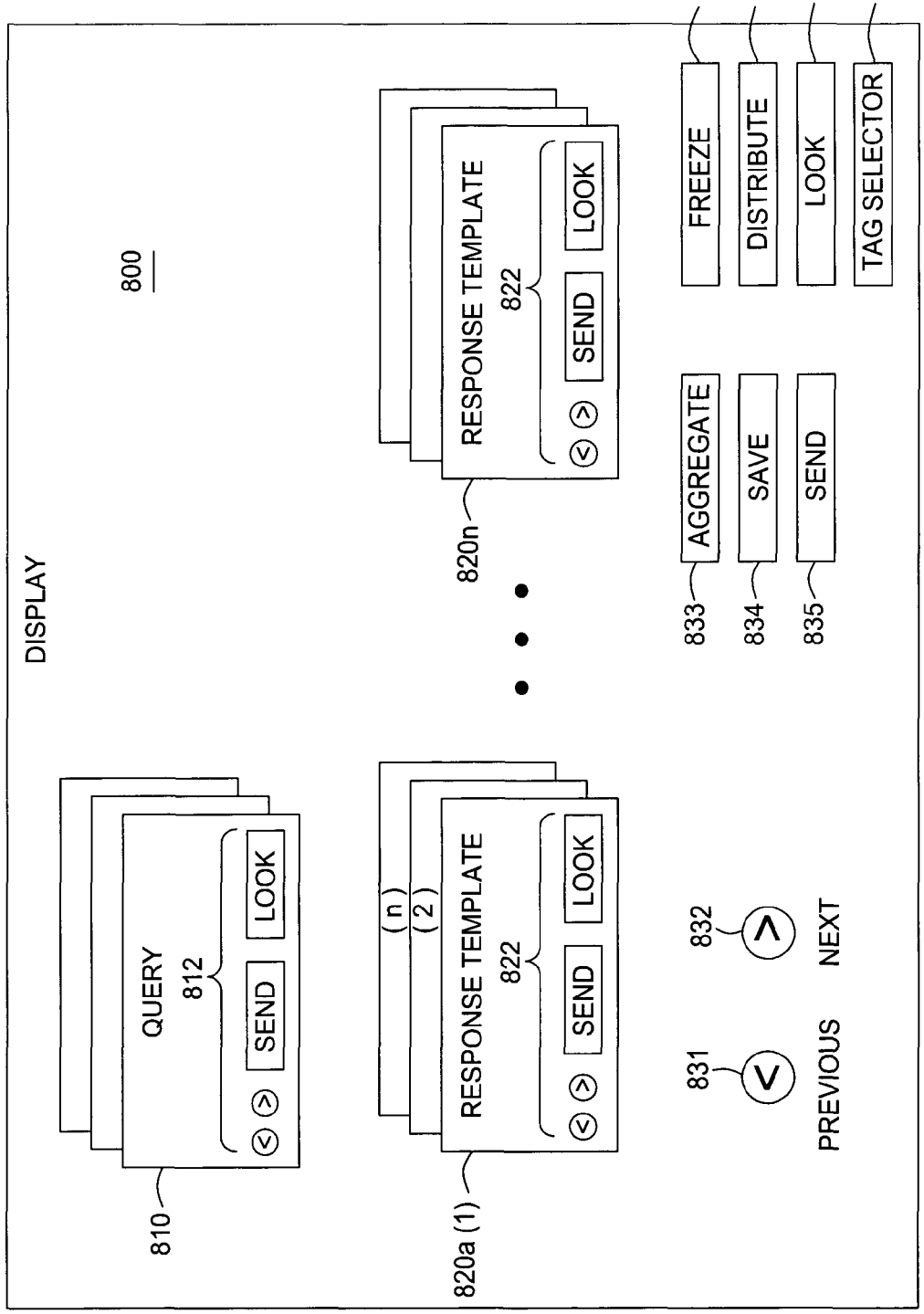

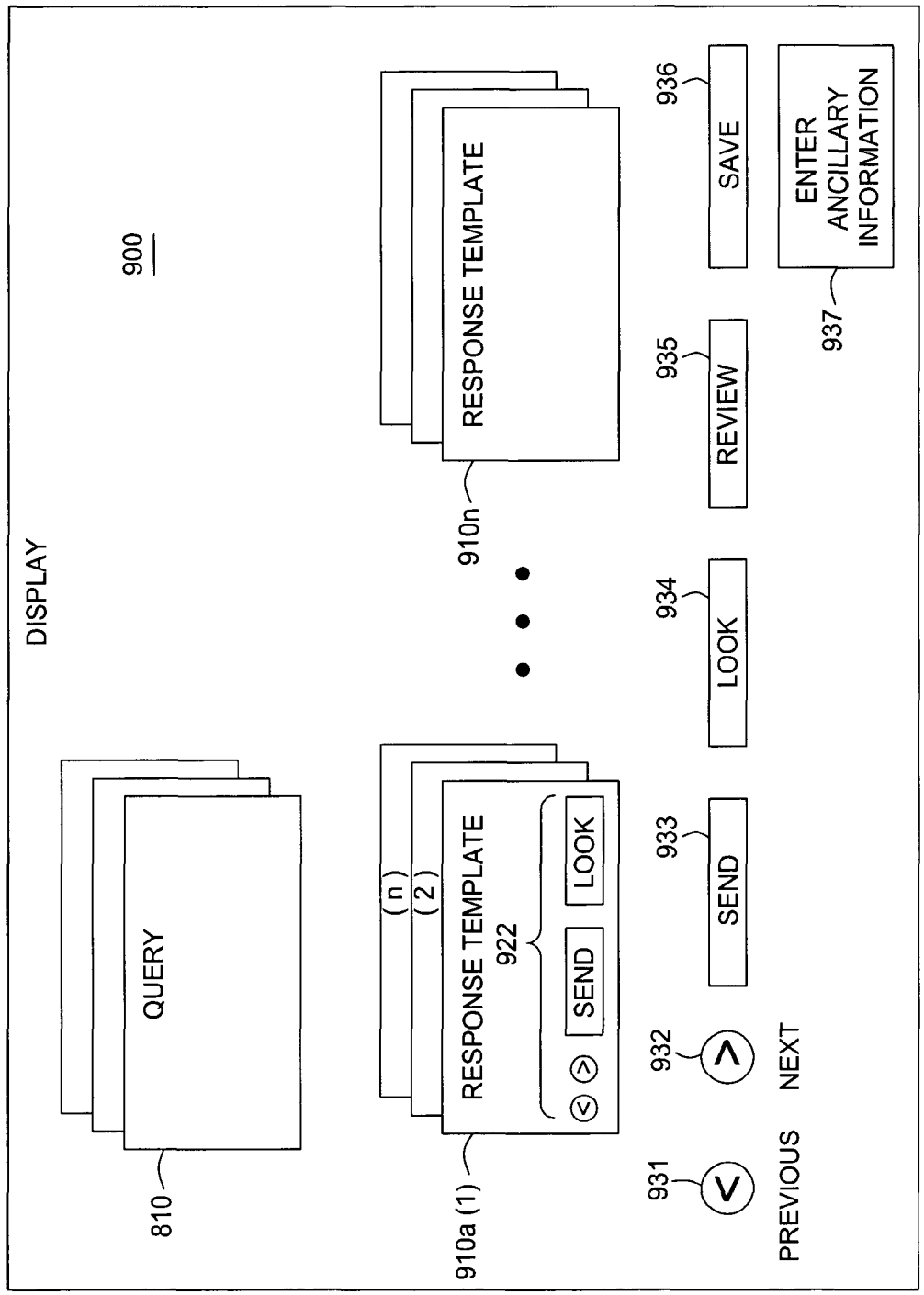

METHOD AND APPARATUS FOR GROUP LEARNING VIA SEQUENTIAL EXPLANATION TEMPLATES

This application is a continuation-in-part of U.S. application Ser. No. 09/792,160, filed Feb. 21, 2001, now U.S. Pat. No. 6,628,918, which is herein incorporated by reference. This application claims the benefit of U.S. Provisional Applications No. 60/398,692 filed on Jul. 25, 2002, which is herein incorporated by reference.

The present invention relates to networked devices, and more particularly to improving educational environments using networked devices. More specifically, the present invention provides a method and system for assessing a student's understanding of a process that may unfold, e.g., over time and space.

BACKGROUND OF THE INVENTION

Good teachers often "take the pulse" of their classrooms by checking how attentive their students are, or by asking students to raise their hands. While this is quick, easy, and cheap, it only works for certain kinds of information. In particular, while seated in a typical classroom configuration, it is hard to indicate a spatial position in a projected image verbally, or with a quick gesture.

In a similar way, students have very few means in ordinary classrooms to gauge their understanding relative to their fellow students. In particular, students may have infrequent opportunities to see how they answered a question relative to their fellow students.

Existing technology-based classroom assessment systems are based upon simple stimulus and response types. Typically, responses are either multiple choice or numeric. Moreover, existing systems show summary data in a form different from that which the student generated the response. For instance, student multiple choices appear on their screen as separate radio buttons, but appear on the summary display in a histogram. An example of such systems is Classtalk, a product that utilizes Hewlett Packard calculators. There are also many systems to allow people in a room to vote, and have poll results instantly tabulated. Finally, there are classroom groupware systems in which students can collaboratively add ideas to a database, or control parts of a simulation; these systems are not quick and easy to use in the course of ordinary classroom activities, but for the most part, demand major changes in the teaching approach.

Educational stakeholders increasingly demand accountability for use of technology in classrooms. Moreover, ample research shows that teachers teach better and students learn better when there is rapid feedback about the students' current state of comprehension or understanding. There is thus a need for a system that provides a quick, easy, meaningful way for teachers to "take the pulse of their students" and for students to see how their current understanding relates to their peer's understanding.

Additionally, psychologists and learning scientists have documented that one of the most powerful positive learning behaviors is self-explanation. Self-explanation is a learner's deliberate attempt to explain a complex concept in a step-by-step fashion, using sound reasons for each step. Not all students, however, are naturally good at self-explanation. Indeed many students need a teacher's support in facilitating, supporting, and critiquing their attempts at self-explanation. Further, not all students are motivated to self-explain. They need some intervention that makes them accountable for their effort. Finally, from a teachers' point of view, it is overly time-consuming to give every student's individual explanation personal attention.

Therefore, a need exists for a method and system for assessing a student's understanding of a process that may unfold, e.g., over time and space, thereby encouraging a learner to explain a complex concept in a step-by-step fashion.

SUMMARY OF THE INVENTION

The present invention provides a method and system for assessing a student's understanding of a process that may unfold, e.g., over time and space. The present invention provides a sophisticated approach of directing students to perform self-explanation, and enables instructors to enhance the value of this pedagogical process by providing meaningful and rapid feedback in a classroom setting.

In one embodiment, a complex query pertaining to a structured entity having a plurality of parts and a plurality of response templates are forwarded by an instructor (e.g., an aggregating device) to a plurality of students (e.g., client devices). This complex query relates to a structured entity having a plurality of structurally interrelated parts, whereby two or more of the parts can be grouped to a response template. In one embodiment, the query and response templates are presented on a display contained on the student client device. The students then complete these response templates, utilizing their client devices. The student responses include self-explanation of the process, structure or other complex phenomenon that is the subject of the query. More generally, the student can pick which template to use for each part of their response and how may templates together form their response. The students then transmit these completed responses back to the aggregating device. The aggregating device then aggregates the student responses according to their associated query part.

BRIEF DESCRIPTION OF THE DRAWINGS

The teachings of the present invention can be readily understood by considering the following detailed description in conjunction with the accompanying drawings, in which:

FIG. 7 illustrates a block diagram of a system for assessing a student's understanding of a process;

FIG. 8 illustrates a display as presented on the aggregating device of the present invention;

FIG. 9 illustrates a display as presented on the client device of the present invention;

To facilitate understanding, identical reference numerals have been used, where possible, to designate identical elements that are common to the figures.

DETAILED DESCRIPTION

Figure 1:
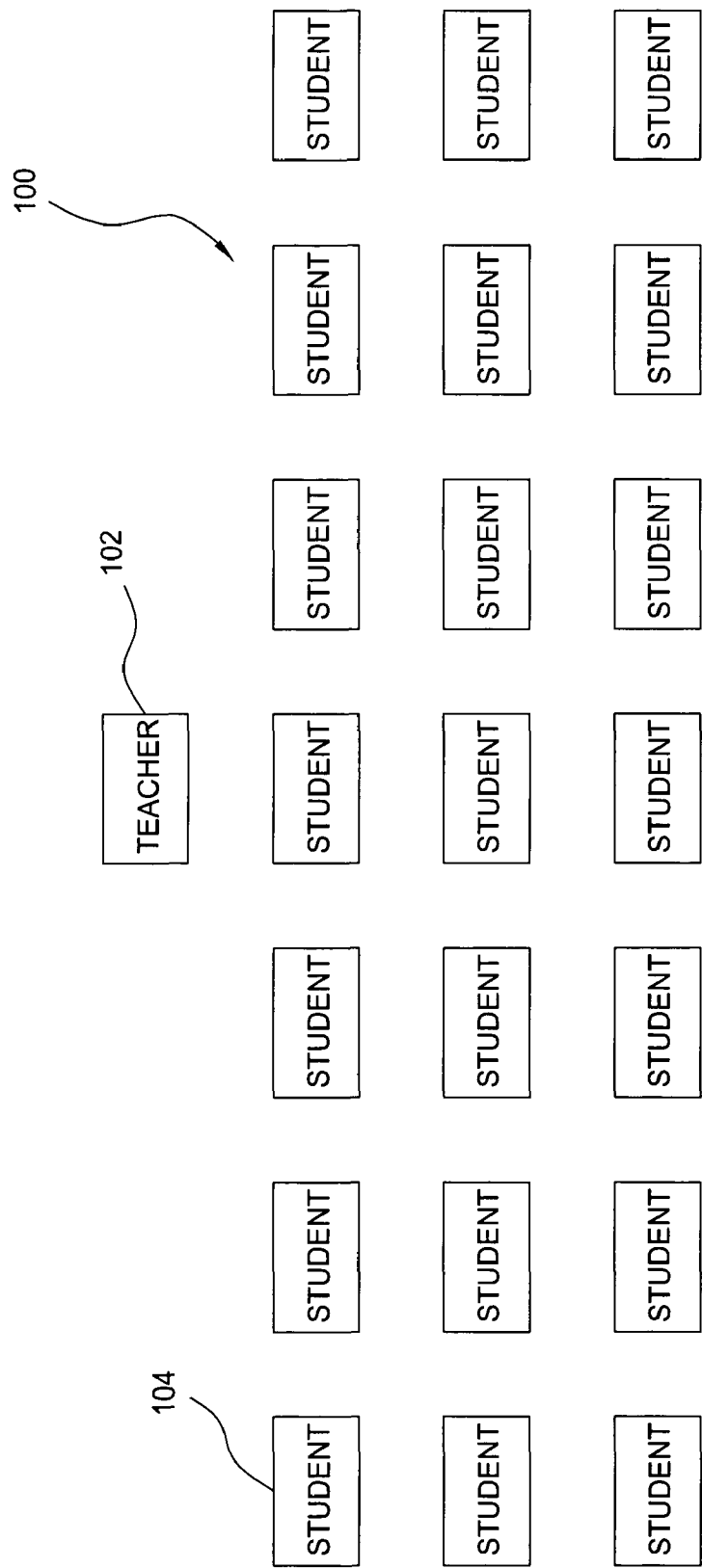
FIG. 1 illustrates one exemplary environment in which the present invention may be implemented.

FIG. 1 illustrates one exemplary environment in which the present invention may be implemented. As shown, an educational environment 100 may be provided with a plurality of students 104 and a teacher 102. It should be noted that any type of environment may be used where a plurality of users are formed in a group which is instructed, addressed, etc. by a head of the group. It should also be understood that the group of students 104 need not necessarily be congregated in a single location.

One exemplary embodiment involves the following system components:
- networked thin client devices, one for each group participant
- a computer or networked thin client device for the group leader
- a programming language that operates on the client devices
- a peer-to-peer directional communication capability between client devices
- a networked server computer
- a programming language that operates on the server
- a networking protocol through which the clients and server can send
  - messages to each other, and optionally among clients
- a data description language in which the clients and server read and write messages for each other, and optionally among clients
- a display visible by the group leader and participants Descriptions for preferred and alternative embodiments are set forth for each component below; the overall assemblage can be realized in many different combinations without undue difficulty. In particular, alternative embodiments may utilize mixed kinds of devices, mixed kinds of program languages, mixed networking protocols, and mixed data description languages.

Figure 2:
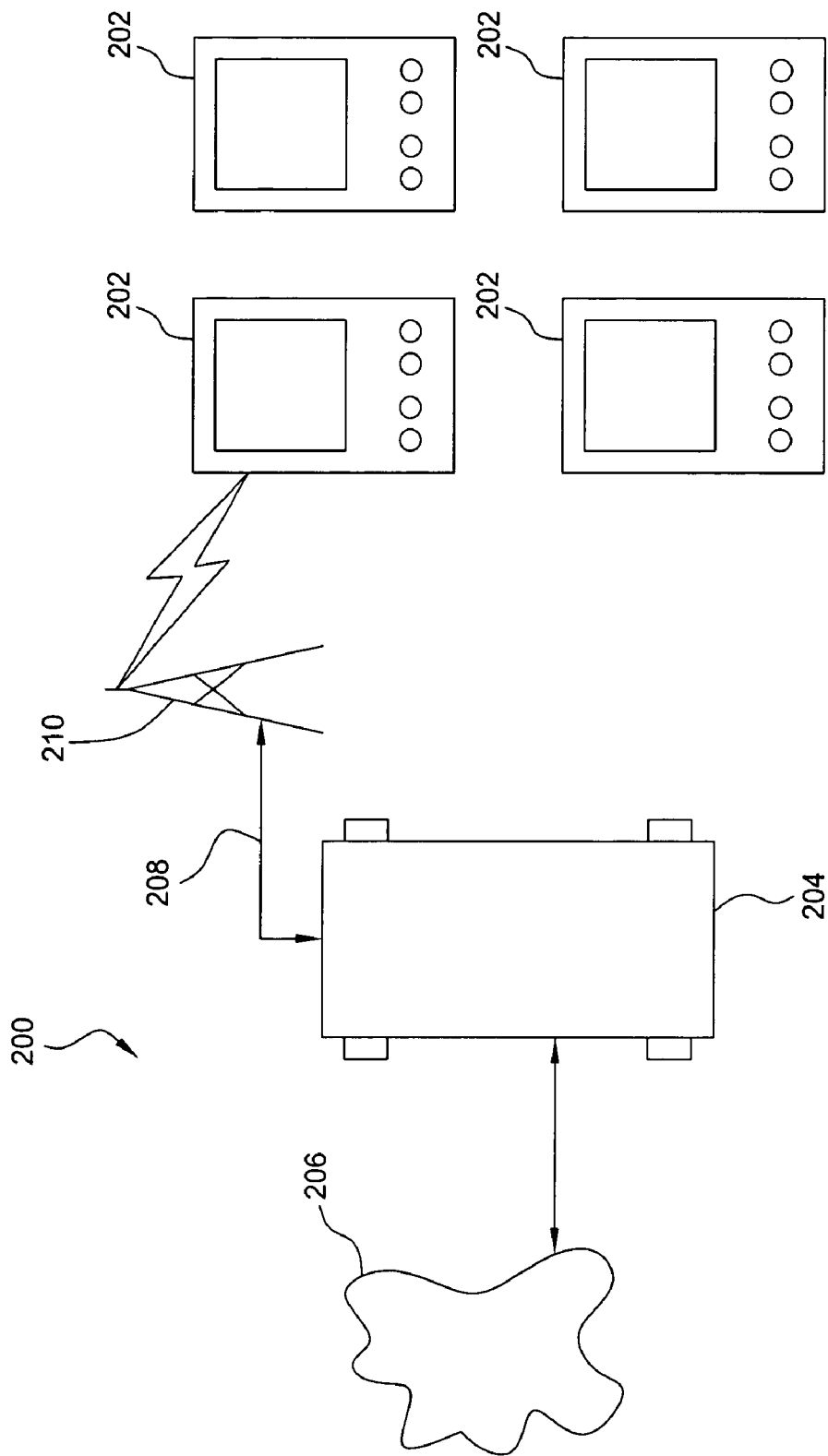
FIG. 2 depicts an exemplary operating environment including one or more thin client devices in connection with a host computer system.

FIG. 2 depicts an exemplary operating environment 200 including one or more thin client devices 202 in connection with a host computer system 204. In one embodiment, each of the students 104 may be equipped with one of the thin client devices 202, and the teacher 102 may be capable of using the host computer system 204. As an option, the teacher 102 may also interface with the host computer system 204 utilizing one of the thin client devices 202. The host computer system 204 may optionally be connected to remote sources of data information on the Internet 206. As an option, the thin client devices 202 may be wireless devices. In such embodiment, the host computer system 204 may include a peripheral interface adapter that provides for the bi-directional transfer of the data via an interconnect line 208 to a transceiver 210 that supports wireless communications with one or more wireless devices.

Figure 3:
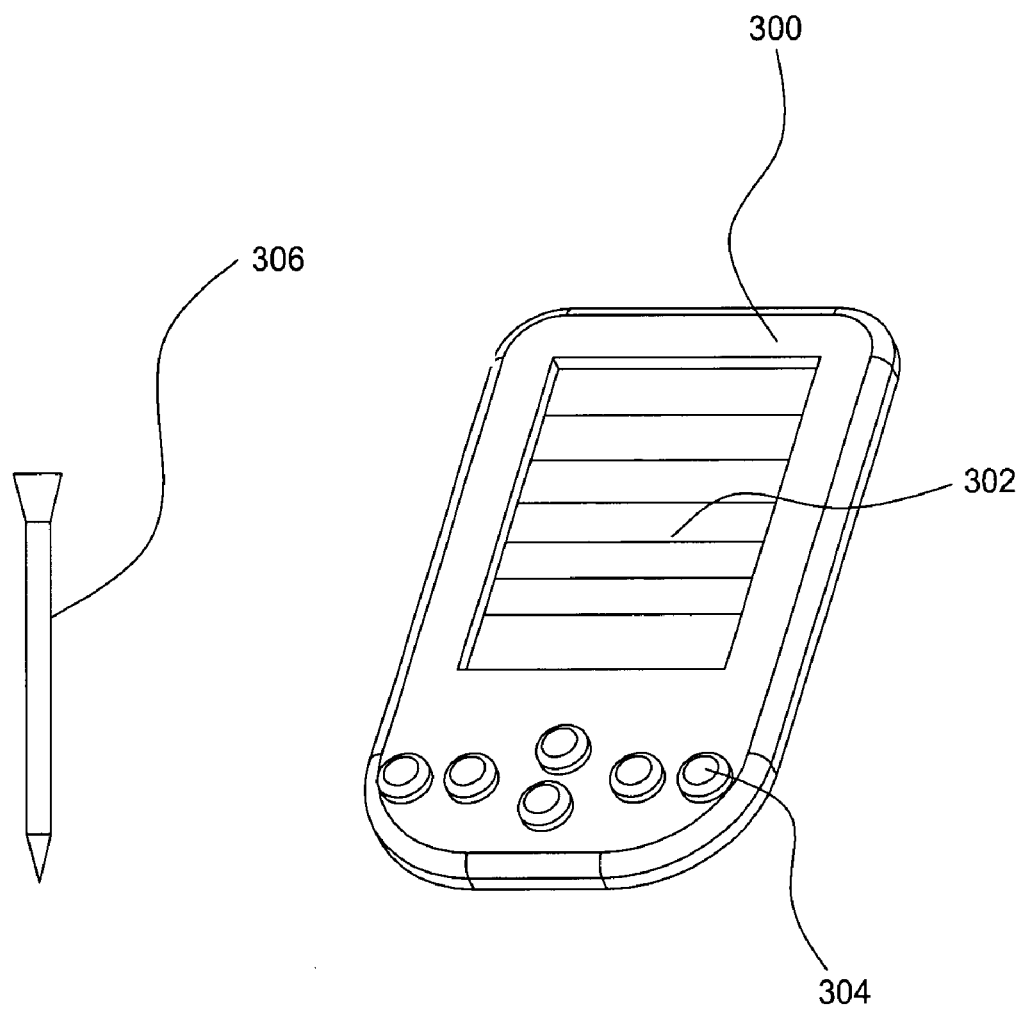
FIG. 3 illustrates an exemplary wireless thin client device.

In one embodiment, each networked thin client device is a handheld, palm-sized computer. FIG. 3 illustrates an exemplary wireless thin client device 300. Such wireless device 300 is preferably constructed with a plastic case housing a display panel 302, a keypad 304, and a stylus 306.

In the present description, use of the term "networked thin client device" it is meant to include a wide variety of personal computing devices with any one or more of various features. For example, such networked devices may have: (a) a means of graphic and textual output (b) a means of pixel-oriented spatial input and textual input and/or (c) a means of networking with other like devices and with a server. Optionally they devices may have a means of peer-to-peer communication with a single, appropriately equipped partner device. Embodiments could include but are not limited to: personal digital assistants, handheld gaming toys, cell phones, graphing calculators, tablet-based computers, and personal computers.

One preferred embodiment is battery powered; alternative embodiments can use any appropriate power source. One preferred device has a plastic or metal case; alternative embodiments can use any casing material appropriate for devices that will be handled by participants. One preferred device provides conveniences such as a cover for protecting the display and a contrast control; alternative embodiments might not have such conveniences, or many more conveniences might be provided. A variety of software can be run on one preferred devices, including address, datebook, to-do list and notebook applications, although none of these software applications are strictly required, and many more such applications could be used in conjunction with an alternative embodiment.

In one preferred embodiment the graphic and textual output is accomplished by means of a 160×160 pixel Liquid Crystal Display (LCD) screen, capable of displaying four levels of gray. In alternative embodiments, the screen may be larger or smaller, may be black and white only, or may display more levels of gray, or may display color. This screen may or may not have a backlight. In another alternative embodiment the screen could utilize a cathode ray tube (CRT) monitor. In another alternative embodiment the screen could consist of paper with ink droplets which can be caused to display or hide digitally, in a pixel array. As additional novel display technologies arise, little effort is foreseen to embody the invention, provided that the display is controllable by software in a manner similar to the control of today's pixel displays.

In one preferred embodiment, spatial and textual input is accomplished by use of a stylus, to write upon the stylus-sensitive LCD screen. The physical contact is recognized by operating system software on the client, and made available to client programming languages as logical input, such as entering text, drawing a line, or selecting a location on the screen. Optionally, buttons on the device can be used to indicate input. In the present embodiment, buttons are used for selecting a client application, and to indicate operations within the client program. Optionally, a keyboard may be attached to the device and used to produce input. In one alternative embodiment, input might be accomplished via audio input; voice recognition software could translate voice input into commands. In another alternative embodiment, spatial input may be accomplished via a physical pointing device such as a mouse, trackball, or joystick. In another alternative embodiment, one or more buttons might be used to indicate spatial positioning. In another alternative embodiment, eye gaze recognition might be used to accomplish spatial input. As additional novel input devices arise, little effort is foreseen to embody the invention, provided that the input is made available to client software in a similar manner as stylus, keyboard, or pointing input is made available to today's client software.

One preferred embodiment incorporates an infrared (1 k) emitter and sensor, which enables the exchange of messages or data with a peer device (popularly called "beaming"). The peer device may be of a similar make and model as the first device, or maybe another make or model of device supporting a similar IR emitter and sensor and a compatible communications protocol. In alternative embodiments, other methods of directional communication may be used, or beaming may not be supported by the device.

One preferred embodied also uses a networked thin client as the computer for the group leader. This networked thin client has the same characteristics listed above. In alternative embodiments, a desktop or laptop computer could be used for the group leader. In alternative embodiments, the server computer might be used directly by the group leader. In alternative embodiments, an infrared or radio frequency remote control might be used by the group leader to control the server. In alternative embodiments the teacher might control the server computer through voice commands. In alternative embodiments, the teacher might control the server computer by actions on a large flat markable display, such as a whiteboard, which has been instrumented so as to send commands to the server.

In one preferred embodiment, the ANSI C programming language is used to create client software on the thin client device, utilizing the operating system provided by the manufacturer on the device. The invention, however, does not require any features specific to ANSI C, and many other programming languages could be used. Object oriented programming is a popular technique. An alternative implementation could use an object-oriented language, such as C++ or Java. Alternative embodiments could also use interpreted languages, such as Basic, or JavaScript. On some devices, there is no support for languages other than assembly language (some models of Texas Instruments' graphing calculators are examples); alternative embodiments could be written in assembly language or machine code.

In one preferred embodiment, the textual program is compiled producing object code, the object code is transferred to the client, and the client code may then be executed. In an alternative embodiment, the textual program may be compiled to a machine-independent format, such as Java byte code. The machine-independent code may then be transferred to the client, and the client code may be executed using a special program that interprets byte code and produces the desired effects (such an Interpreter is conventionally called a "virtual machine"). In alternative embodiments, the textual program may be transferred to the client without prior compilation, and executed via a program called an interpreter. An interpreter reads the program directly and produces the desired effect. Basic is an example of an interpreted language.

Alternative embodiments have been described using a variety of programming languages and means of executing programs written in those languages. Although programming languages differ in the means they afford for expression, and the means they offer for execution, different programming languages can be used to the produce the equivalent input/output and information processing behaviors. No particular difficulties are foreseen in deploying the invention in alternative embodiments using any programming language that can execute on the client device and produce equivalent input and output, and perform the requisite information processing steps.

Figure 4:
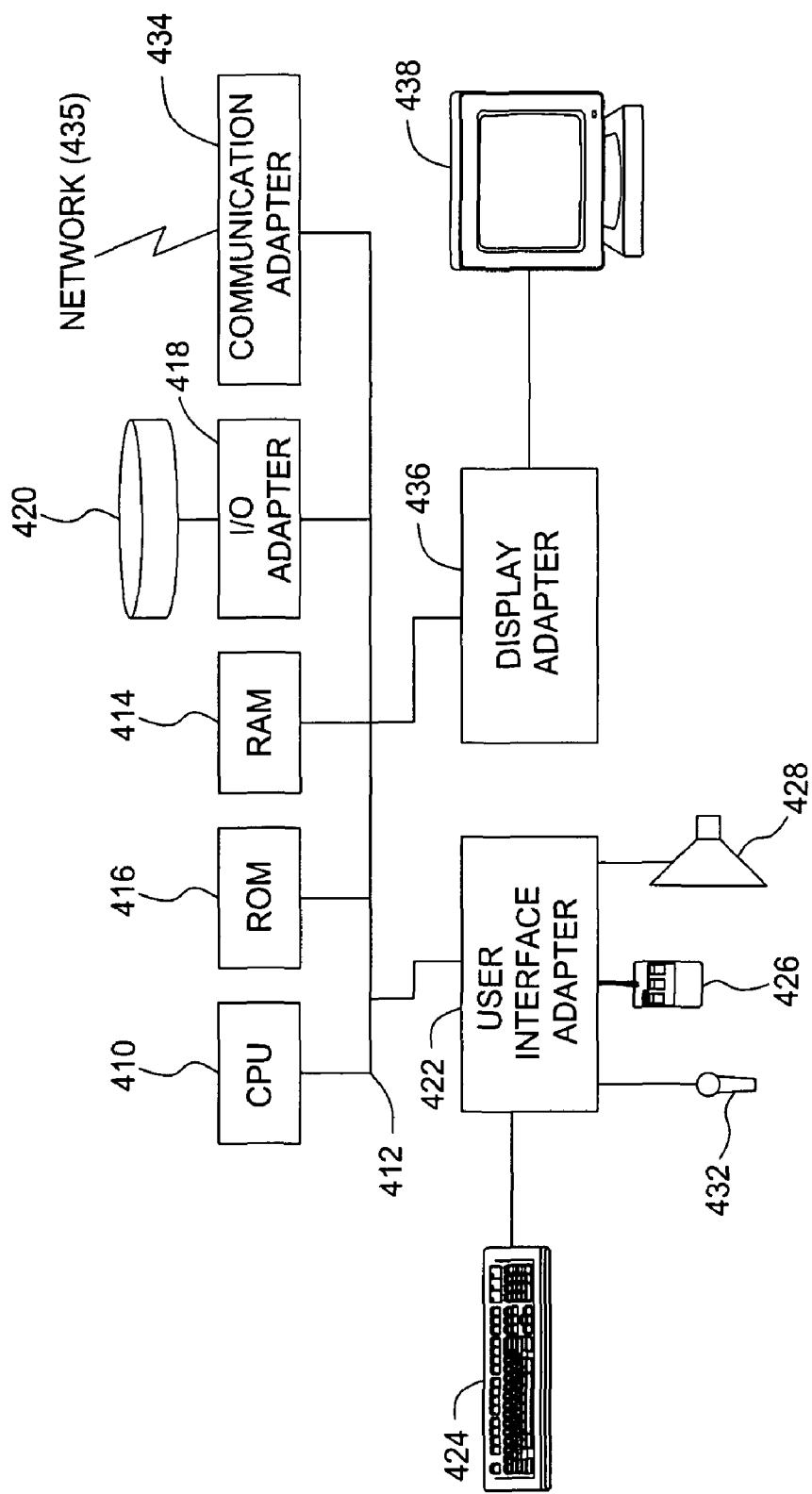
FIG. 4 shows a representative hardware environment associated with the host computer system of FIG. 2.

FIG. 4 shows a representative hardware environment associated with the host computer system of FIG. 2. Such figure illustrates a typical hardware configuration of a workstation in accordance with a preferred embodiment having a central processing unit 410, such as a microprocessor, and a number of other units interconnected via a system bus 412.

The workstation shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen (not shown) to the bus 412, communication adapter 434 for connecting the workstation to a communication network 435 (e.g., a data processing network) and a display adapter 436 for connecting the bus 412 to a display device 438.

In one preferred embodiment, the server computer is a stock Power Macintosh G4 with an 802.11b networking card installed. This server computer has a central processing unit, random access memory (RAM), read only memory (ROM), disk storage, Ethernet networking hardware and connectors, and capabilities for attaching input and output devices, principally a keyboard, mouse, and CRT monitor. The Power Macintosh G4 also has an antenna, card, and software support wireless networking via the IEEE 802.11b standard. The server computer has operating system software capable of executing server programs, which can intercommunicate with clients and other servers, and can access RAM, ROM, and disk storage. Alternative embodiments could use other computer hardware. A wide variety of processing chips might be used, including Pentium, SPARC, ARM, Crusoe, or other processing chips. More than one processing chip might be used in the same server. A wide variety of storage devices might be used. In alternative embodiments storage might reside on devices outside the main computer box, connected by dedicated wiring, or by general-purpose networking. In alternative servers, other physical networking layers might be supported, as will be discussed below. In alternative embodiments other operating systems might be used, such as Linux, Solaris, Windows95, Windows98, Windows NT, or Windows 2000. In alternative embodiments, a coordinated collection of computers might collectively act as the server. In alternative embodiments, the server might be a network appliance, with no provision for input and output devices, other than a connection to a network. In alternative embodiments, the server might also reside on a client device, with one client acting as server, or acting as both client and server. As described immediately below, there are many alternative networking embodiments. An alternative server embodiment may not have an Ethernet card and connector, but would only have the networking hardware and connectors used for its specific networking option. Likewise, if 802.11b is not the networking embodiment used, the server might not have an 802.11b card and antenna.

One preferred embodiment uses Java as the programming language on the server. In particular, the Servlet Application Programmer Interface (API) is used to write server programs. Textual server programs are compiled into Java byte code. A virtual machine executes this byte code. One preferred embodiment utilizes a Java web server program within which the program executes. In alternative embodiments the Java program could be executed in conjunction with other web server programs, such as Apache, Netscape, or Microsoft web servers. The discussion of alternative program languages presented with regard to client program also pertains to server programming. A wide variety of program languages and means of executing programs offer equivalent capabilities. Alternative embodiments could thus be constructed many different programming languages and execution facilities. A list of possible languages, which is by no means exclusive, includes C, C++, Python, Perl, Active Server Pages, Java Server Pages, JavaScript and Basic.

Networking is generally conceived of in terms of layers; although 7 or more layers are commonly used, the present discussion will be simplified to three layers: physical, transport, and application.

One preferred embodiment uses a combination of infrared (IR) beaming and Ethernet cabling as physical layer. Alternative embodiments of the physical layer could use radio frequency (RF) communication in the 900 megahertz, 2.4 Gigahertz, or other spectrums, as an alternative to IR. Alternative embodiments could also use wired connections to a partner device (such as a cell phone) which is then connected to the network. It is the nature of internet protocols to allow many combinations of physical topology and infrastructure to interoperate, and thus endless combinatorics prevent us from listing all possible alternative embodiments of the physical layer. At any rate, any physical layer will suffice as long as it connects the devices and allows a suitable network protocol to be used to exchange information among them.

One preferred embodiment uses TCP/IP for the middle transport layers. For IR communication Point to Point Protocol (PPP) is used over irDA to make a TCP/IP connection to a wired Ethernet switch, which then provides TCP/IP connectivity to the rest of the wired network. One preferred embodiment runs TCP/IP over PPP over irDA. Alternative embodiments could use TCP/IP over Bluetooth, 802.11, or HomeRF standards. An alternative embodiment could substitute AppleTalk, a newer version of TCP/IP or another transport protocol for the present use of TCP/IP. Transports are generally equivalent, for the purposes herein, provided they can deliver messages between the two addressable devices in a timely and reasonably dependable fashion, and those messages can support an application protocol such as HTTP and data such as XML.

Sockets are used at the application layer, using a custom protocol for communication. This protocol is a simplified version of the HyperText Transport Protocol (http), and allows for requesting information from the server via GET operations and sending information to the server via POST operations. A secondary socket channel is also used to send change notification messages from server to client. The protocol for this channel consists of POSTing a "changed" message with optional timestamp information, as well as an optional indication as to what changed. An alternative embodiment could use the Object Exchange protocol (OBEX). Another alternative embodiment could use HTTP 1.0 or greater; many programming languages contain libraries or classes that directly support these protocols without direct reference to sockets. Little difficulty is foreseen in using alternative logical representations of a communications channel between devices, so long as it provides read and write operations that receive and send structured textual and/or binary data between addressable devices, along the lines of the http get and post messages.

One preferred embodiment uses a simplified form of the extensible markup language (XML) for structuring the data messages which are exchanged among clients and the server. An alternative embodiment could use HTML. An alternative embodiment could use a binary message format that contains equivalent information. An alternative embodiment could use XML without simplification. An alternative embodiment could use another structured text description language, so long as matching encoders and decoders can be written for both sides of the communication channel.

One preferred embodiment includes a public display, visible by the group leader and group participants. A computer projector is used to cast this image upon a reflective, flat surface at the front of the room. In alternative embodiments, a wide variety of projection technologies could be used. The projection could be from in front of or behind the screen. The projection unit might contain a light source, or rely upon an external light source. In alternative embodiments, the large public display might be large CRT monitor or LCD display. In alternative embodiments, participants may not be in the same room, and the "public" display may be a display area reserved for this purpose on their remote computer or device. In general, any device may serve as the public display as long as (1) it can display computer graphics images (2) the computer graphics images can be controlled by a computer, such as the server or the group leader's computer, (3) all participants can see it when required by the group activity to do so.

Figure 5:
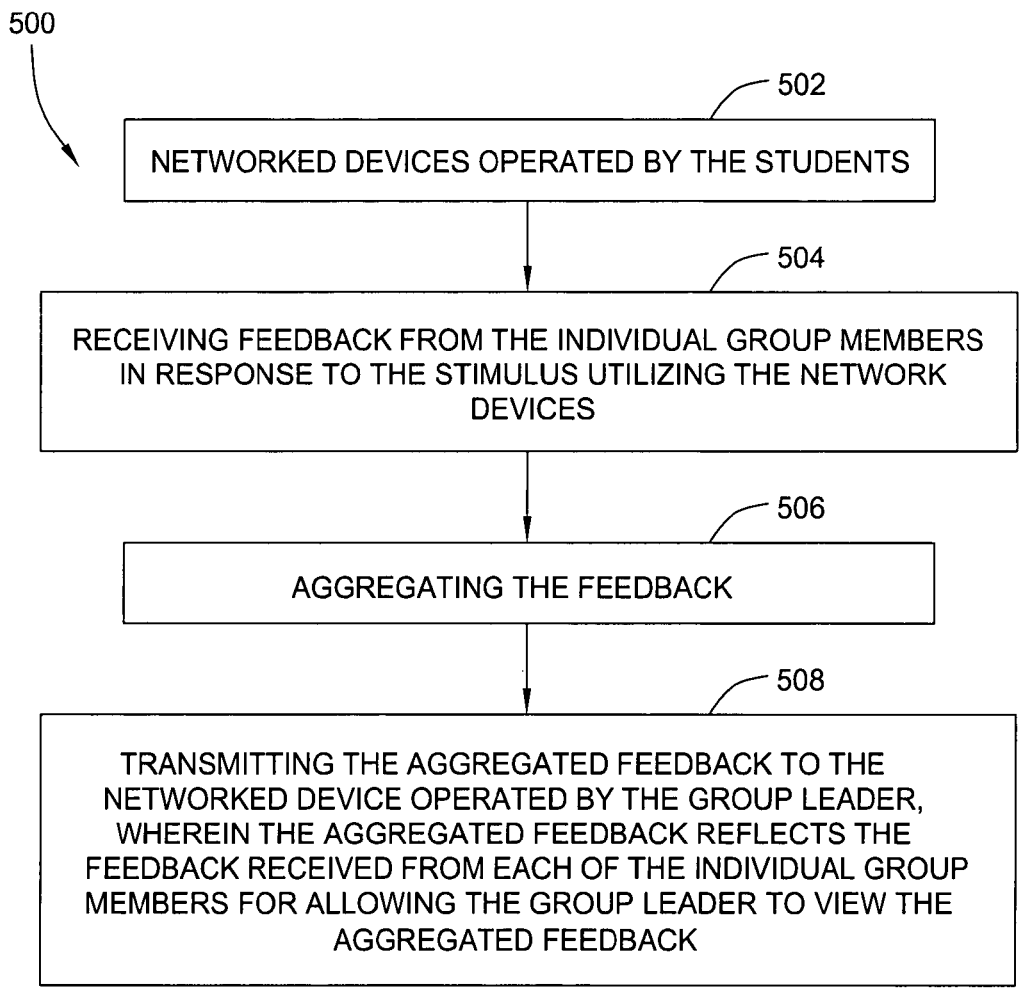
FIG. 5 illustrates a method for giving feedback in an educational environment using networked devices.

FIG. 5 illustrates a method 500 for giving feedback in an educational environment using networked devices, in accordance with one embodiment of the present invention. As an option, the networked devices may include thin client devices. Further, such thin client devices may include wireless devices. Still yet, the wireless devices may include handheld wireless devices such as personal digital assistants (PDAs) each including a stylus, as set forth hereinabove during reference to FIGS. 2 and 3. It should be noted, however, that any type of networked device may be employed per the desires of the user.

Initially, in operation 502, an image stimulus is displayed to a plurality of individual group members regarding material being presented by a group leader utilizing a plurality of networked devices operated by the group members. The image stimulus may be displayed to each of the group members, or just to a select number thereof. As an option, the group leader may be capable of selecting which of the individual group members to which to display the image stimulus. Further, the image stimulus may be personalized for different students. Still yet, the image stimulus may be displayed to a random number of students.

In a classroom environment, the group members may include students, and the group leader may include a teacher. It should be noted, however, that the present invention may be employed in any desired environment.

The image stimulus may include any visual material that is being used for educational purposes. For example, the visual material may be a 2-dimensional image, such as a map or diagram. Or, in another example, the visual material may be a 3-dimensional image, such as a globe. In still another example, the image stimulus may include, but is not limited to a plurality of sequentially displayed frames of images, i.e. a movie, during which real-time feedback may be provided. In still other environments, a laptop computer with LCD projector may be employed.

Content of the image stimulus may vary widely based on the material presented by the teacher. Specific instances of use might include:

Displaying a map of the United States, and asking students to mark the regions with the highest annual rainfall (geography class);

Displaying a schematic of a circuit, and asking class to mark where they
would place a voltmeter probe to measure to test for a particular fault;

Displaying a Cartesian graph, and asking students to sketch a particular
mathematical function.

Displaying a famous painting, and asking students to select a region of the image to highlight the artists use of a particular visual effect.

Displaying an image from Gray's anatomy, and asking students to mark the location of a particular muscle.

Displaying a 3-D rendering of a molecule, and asking students to mark a hydrogen atom.

In still another embodiment, the image stimulus includes information associated with a reference coordinate system for use in describing the position of the feedback, as will soon become apparent. Further, the networked devices may be capable of changing a view of the image stimulus by performing a control operation selected from the group consisting of scrolling, zooming, rotating, filtering, and processing.

As an option, the image stimulus may include an image corresponding to a model of one or more spatial objects and interactions among the spatial objects. Moreover, the image may change over time according to either rules or input.

The image stimulus may be displayed to the group members utilizing a projector. Further, the image stimulus may be displayed to the group leader on a networked device visible to the group leader.

After the image stimulus is presented, feedback is received from the individual group members utilizing the networked devices. Note operation 504. Such feedback may include any type of input provided by the group members on the networked devices. Examples of such feedback will be set forth hereinafter in greater detail.

As an option, the feedback may be received from the individual group members only after the feedback is entered by the individual group members, and the feedback is subsequently authorized for transmission. In particular, a prompt may be displayed to the user for allowing a user to review his or her feedback before submitting the same. In one example, an SEND button may be provided for such purpose.

In one embodiment of the present invention, each feedback may include at least one point, shape, or region selected by at least one of the individual group members. Moreover, the feedback may include textual input provided by at least one of the individual group members. Still yet, the feedback and information pertaining to the feedback may be displayed to the individual group members utilizing the networked devices. Such feedback and information may also be transmitted to the server computer.

The feedback may also include attributes selected by the individual group members in conjunction with the feedback. Such attributes may include color, geometric information, textual information, audible information, visual information, etc.

In still another embodiment, the individual group members may each be capable of contributing more than one instance of feedback. Optionally, each instance of feedback may be assigned a unique identifier. As such, the individual group members are capable of deleting or modifying a previous instance of feedback by communicating with the server computer, using the unique identifier. Moreover, the individual group members are capable of deleting, modifying, or adding attributes associated With a previous instance of feedback by communicating with the server computer, using the unique identifier. As an option, the group leader may determine allowable attributes associated with the feedback.

Further, the group leader may be capable of requiring the group members to select specific attribute types or values with the feedback. The server computer may communicate information relating to the allowable attributes to the networked devices, and the network devices may automatically limit the feedback in accordance with the information. Further, the server computer may communicate upon the feedback no being allowable such that the associated networked device can inform the group member that the feedback was disallowed.

In still another embodiment of the present invention, the image stimulus may include information associated with a reference coordinate system for use in describing the position of the feedback.

As yet another enhancement, the feedback may include information identifying the group member associated therewith. Further, such information may also include connection or session information. Optionally, the feedback may be assigned a date and time when the feedback is the subject of an action selected from the group consisting of received, created, and last modified.

The feedback is then aggregated in operation 506, after which the aggregated feedback is transmitted to the networked device operated by the group leader. See operation 508. Such aggregated feedback may reflect the feedback received from each of the individual group members for allowing the group leader to view the aggregated feedback.

The feedback may be any form of a 2 or 3-dimensional visual display. In one embodiment, the form of the visual display is visually analogous to the form in which results will be displayed and aggregated. More information regarding such feature will be set forth in greater detail in FIGS. 6A and 6B.

In still another embodiment of the present invention, the group leader may be allowed to select at least one of a plurality of summary types. The feedback may thus be aggregated based on the selected summary type. Summary types may vary. For example, a group leader may choose between a graph, an analogous display, a clustering display of the students based on their responses, etc. Further, the feedback may be compared with a correct response for distinguishing the feedback based on the comparison. Optionally, the feedback may be distinguished using color-coding. For example, all correct answers may be displayed in a first color, and all wrong answers may be displayed in a second color. In each instance, the system instantly aggregates student responses and displays the result in the summary representation.

As an option, the aggregated feedback may maintain the identity of the individual group member's secret. On the other hand, the identity may also be disclosed using color coding, identifiers, etc. As an option, the group members may be divided into sub-groups which may be uniquely identified.

While the teacher may best use the aggregated feedback, such feedback may also be made available to others. For example, it may be transmitted to the networked devices operated by the individual group members. In yet another embodiment, the aggregated feedback may be stored for display utilizing the Internet. This may be done for allowing other interested members to review the feedback. In a children classroom setting, such functionality would allow parents to monitor progress of their children.

In yet another embodiment of the present invention, the aggregation step may include multiple operations, where each operation is executed based on an output of a previous operation. As such, the aggregation step may produce multiple outputs each associated with one of the operations. This may be done without affecting a state of other operations.

The multiple outputs may be sorted and filtered utilizing criteria associated with the feedback. As an option, a copy of the multiple outputs may be stored before being used for other operations. Such operations may include changing feedback, adding feedback, removing feedback, and/or modifying attributes associated with the feedback. Still yet, the operations may be capable of generating information relating to a correctness of the feedback.

As an option, the feedback may be aggregated into a form similar to that associated with the image stimulus. Further, the aggregation may indicate the variability in spatial reference present in the original feedback.

The variability in spatial reference present in the original feedback may also be reduced by treating the feedback which is spatially related as being the same. This is accomplished by treating feedback which falls within predetermined regions as being the same. In a similar embodiment, related feedback may be displayed as an object a size of which is proportional to an amount of related feedback. As such, related feedback may be displayed as a stacked series of the objects with each object representing the feedback of one of the group members.

To further enhance the output of the aggregation of the feedback, the aggregated feedback may be displayed in a foreground and the image stimulus displaced in a background. Such background may be displaced with respect to the foreground utilizing effects such as layering, adjusting transparency, and/or modifying color.

The user may modify a perspective of the aggregated feedback by performing a control operation such as scrolling, zooming, rotating, filtering, and/or processing. As an additional option, sounds may be emitted and textual information may be displayed upon receipt of the feedback.

Figure 6A:
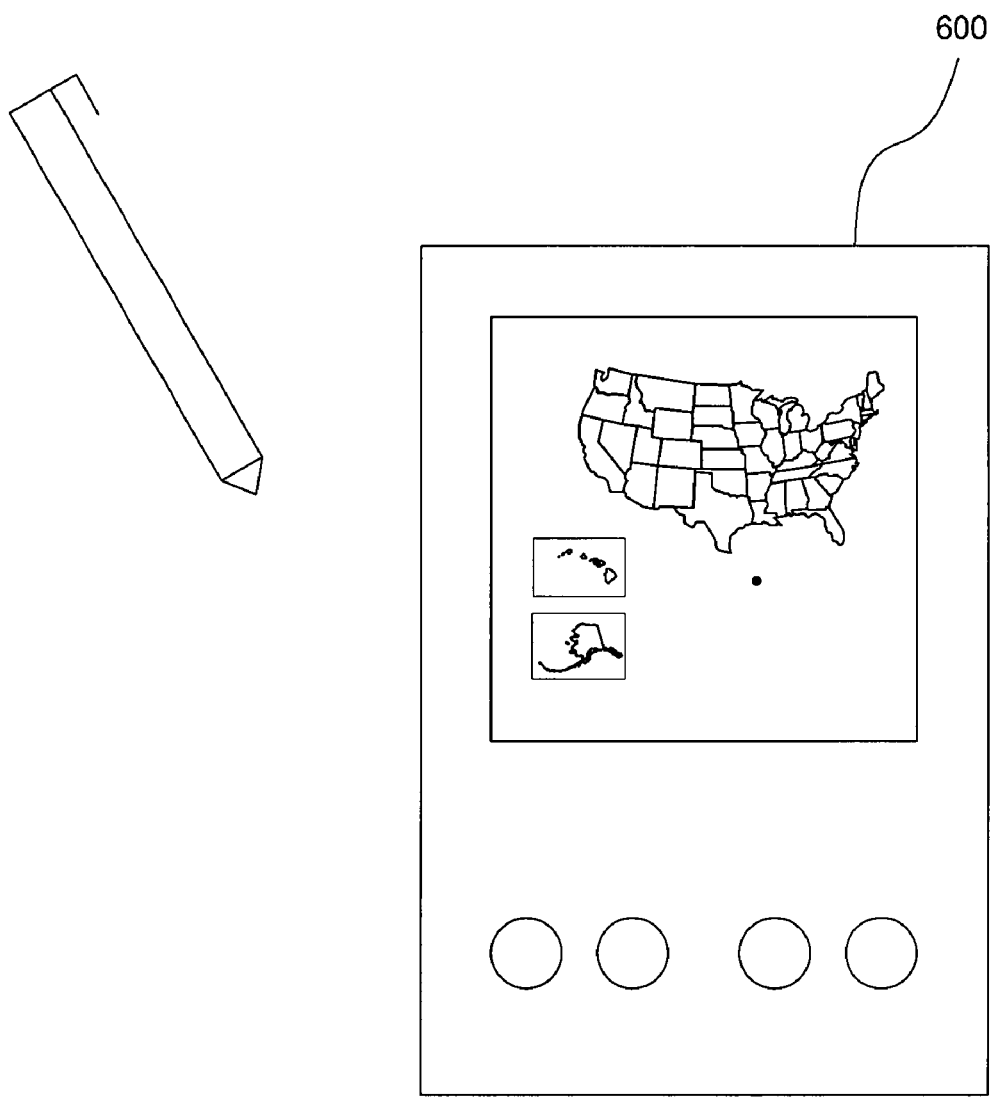
FIGS. 6A and 6B illustrate one example of use of the present invention.
Figure 6B:
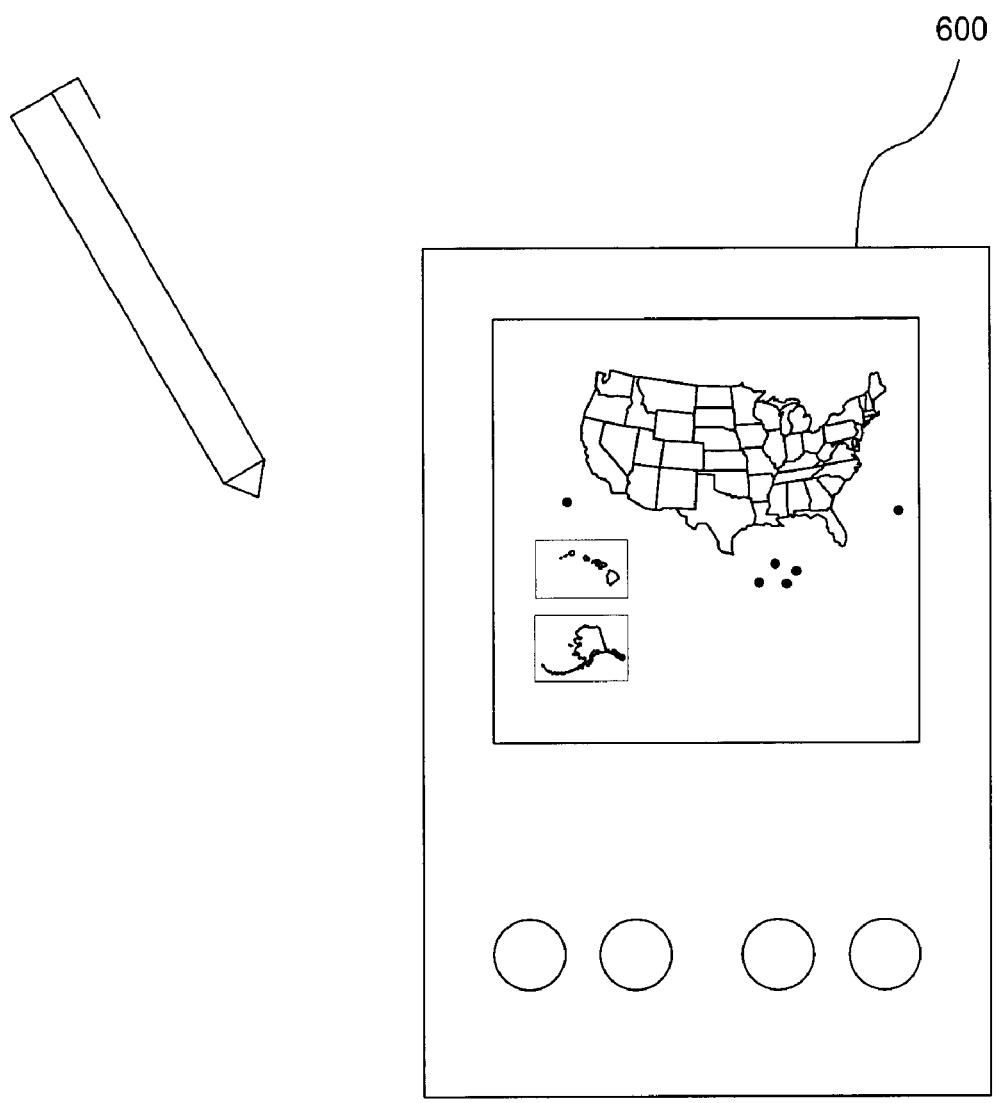

FIGS. 6A and 6B illustrate one example of use of the present invention. In operation, the students are able to mark their individual response on their personal device by placing a mark spatially on the representation. See screen 600 of FIG. 6A. In the present scenario, each student may mark where they think the Gulf of Mexico is located.

The resulting student marks are aggregated and redisplayed to the classroom in a "summary" representation. See screen 610 of FIG. 6B. This allows a teacher to quickly see if all students are "in the same place" or if there are some differences of opinion or outliers. As an option, the students themselves may analyze the aggregation. Because the students make their individual marks in a representation analogous to the one used in the aggregate, they can self-identify whether they had a similar or different response from their classmates.

The present invention thus specifically targets kinds of displays of understanding which are hard to indicate verbally, or with a quick gesture. Because their mark appears in the summary representation in a fashion analogous to how it looks on their individual display, it is easy for students to self-identify their own response and compare it to the aggregate.

The present invention is further quite generic across learning topics, and because it relies primarily on images, could be compatible with many types of application-specific software which can render and mark images. By building such assessment expertise into such a generic capability, the present invention offers 3rd parties a way to increase the value of their systems.

Education theorists have established that student learning ability is enhanced when they are required to perform self-explanation, defined as students demonstrating complex concepts to themselves. One alternate embodiment of the present invention provides a new and sophisticated approach of directing students to perform self-explanation, and enables instructors to enhance the value of this pedagogical process by providing meaningful and rapid feedback in a classroom setting.

FIG. 7 illustrates a block diagram of a system 700 for assessing a student's understanding of a process. Specifically, the system comprises an aggregating device or an instructor device 710 and a plurality of student-operated client devices 720*a-n*, with each device being allocated for use by a corresponding student. In one embodiment, each of the student client devices 720 and the aggregating device 710 is implemented using a general-purpose computer or any other hardware equivalents as shown in FIG. 7. For example, both the aggregating device 710 and the student client devices 720 comprise a processor 712, 722*a-n*, a memory 714, 724*a-n*, and a plurality of input/output (I/O) devices 716, 726*a-n*, respectively. The Input/Output (I/O) devices may comprise a keyboard, a keypad, a touch pad, a touch screen, a mouse, push buttons for defined functions, an electronic pointing or writing device (e.g., a stylus), a display, a storage device, e.g., a disk drive or an optical drive, a transmitter, a receiver, a speech synthesizer, a graphical user interface, a microphone, an audio speaker, a thumbwheel, a dial, a tilting surface or set of buttons allowing North-South-East-West navigation, and the like. As such, the methods of the present invention (including associated data structures) can be stored on a computer readable medium, e.g., RAM memory, magnetic or optical drive or diskette and the like.

Although a "student client device" 720 is preferably implemented as a portable device, it should be noted that the student client device can also be implemented using a larger computer system, e.g., a desktop computer or server and the like as required in a particular application. The aggregating device 710 is linked to the respective student client input devices 720*a-n* by a communications link or channel 717, e.g., a hardwired or a wireless network, employing optical fibers, radio and/or infrared signals.

The present invention comprises a process whereby a complex query 715, e.g., stored in memory 714, is distributed to the student input devices 720*a-n*. This complex query 715 relates to a structured entity having a plurality of structurally interrelated parts, whereby two or more of the parts can be grouped to a response template 725*a-n*. In a preferred embodiment, the query 715 and response templates 725*a-n* are presented on a display contained on the student client device 720*a-n*. The students then complete these response templates, utilizing their client devices 720*a-n*. The student responses include self-explanation of the process, structure or other complex phenomenon that is the subject of the query 715. The students then transmit these completed responses back to the aggregating device 710. The aggregating device 710 then aggregates the student responses according to their associated query part.

FIG. 8 illustrates a display 800 as presented on the aggregating device 710. The display illustrates a complex query 810 related to a structured entity having a plurality of structurally interrelated parts, one or more sets of response templates 820*a-n*, and a plurality of controls 831-839.

In operation, the complex query 810 is intended to test the understanding of a sequential process having a plurality of steps or a structured entity having a plurality of interrelated parts. Thus, complex query 810 is interpreted to be a query that must be satisfied by a response that addresses a plurality of structurally interrelated parts. Thus, complex query 810 may take the unitary form of: "Describe the steps in producing an electrolyte solution".

Alternatively, complex query 810 may take a form that has a plurality of sub-queries, i.e., a multi-part complex query: 1) "Describe the state of sodium chloride before being dissolved in a liquid"; and 2) "Describe the state of sodium chloride after being dissolved in a liquid". Thus, complex query 810 may require a response that explains a structured entity selected from a group comprising 1) a sequential multi-step process, 2) use of poetic devices in a poem, 3) a multi-step transformative process, 4) a multi-step computer subroutine, 5) a multi-instrumental musical composition, 6) a multi-part biological organism, 7) a multi-feature architectural structure, 8) a computer program having multiple subroutines, 9) a computer data structure having multiple fields and so on. Examples are provided below to demonstrate some of these structured entities. However, these examples should not be interpreted to be exhaustive.

Alternatively, the complex query 810 may take a form where the structured entity is presented in a multi-frame, multi-highlight, or multi-layer depiction. For example, the structured entity can be a multi-frame image sequence, e.g., a video clip, where the student can navigate through the sequence of image frames. Alternatively, the structured entity can be a large block of text with multi-highlighted passages, where the student can navigate through the highlighted passages. In yet another example, the structured entity can be a multi-layer image, e.g., a dissection of a frog with a plurality of transparent layer of images that can be peeled back by a student.

Since a proper response to the complex query 810 is intended to require a response that addresses a plurality of interrelated parts of a structured entity. FIG. 8 illustrates a plurality of response templates 820*a* (1-n) corresponding to each complex query 810. In one embodiment, each of the response templates 820*a* (1-n) is intended to address a particular part of the structured entity.

However, depending on the implementation, it is possible to allow a response template to address more than one part of the structured entity. One powerful advantage of the present invention is that a particular response may use a template (for its structure) that relates to a particular part or relationship in the multi-part query stimulus. Thus, the response allows the student to "index" different parts or relationships of the structured entity. Examples of relationships would be: (a) literary foreshadowing and the later direct statement of the idea previously foreshadowed, (b) the relationship between a proof step and the prior steps, or (c) the relationship between two bodily organs in an anatomy diagram.

The display 800 also illustrates that response templates received from a plurality of client devices can be displayed at the same time. Namely, an instructor may review responses from a group of students simultaneously. In fact, as described below, the instructor may aggregate a plurality of response templates to view a summary report of the students' responses.

It should be noted that controls 812 and 822 can be optionally embedded into the complex query 810 and response templates 820*a-n*. These controls allow the user to effect functions such as to select a previous frame, to advance to a next frame, send a frame or look at a frame. A frame is intended to broadly cover a query and/or a response template.

Alternatively, "virtual" controls, buttons or menus 831-839 can be displayed within display 800. Specifically, previous control 831 allows a user to select a previous frame. Next control 832 allows a user to select a next frame. Aggregate control 833 allows a user to aggregate response templates for a particular query or to aggregate response templates that address a part of a query. Save control 834 allows a user to save data, e.g., response templates, aggregated results, complex queries and so on. Send control 835 allows a user to send data to a particular remote client device 720, e.g., sending a query, a response template or an aggregated result to a student device. Freeze control 836 allows a user to freeze or prohibit a client device from accessing or viewing response templates from other individuals. Distribute control 837 allows a user to distribute data to a plurality of client devices 720*a-n*, e.g., sending a query to all student devices. Look control 838 allows a user to look at data, e.g., to look at a particular response template. Tag selector control 839 allows a user to select response templates having particular tags, e.g., generic tags that identify a student name, a student number, a class number, a grade level, a school number and so on. It should be noted that although controls 831-839 are presented as virtual controls, these controls can be implemented as physical buttons of the aggregating device 710.

Alternatively, the tags can be descriptors that are attached to the structured entity to form the response, e.g., attaching the tag "hyperbole" to a particular line of a poem, or the tag "abnormal" to a particular frame of an anatomy dissection, or the "Side-Angle-Side" to a particular step in a geometric proof of the congruence of triangles. Thus, the tags are descriptors that are meaningful in the subject matter domain, in contrast to free form input, thereby making it easier for teachers to count and compare the similarities and differences between how different students responded to the same image part.

FIG. 9 illustrates a display 900 as presented on the client device 720. The display illustrates a complex query 810 that is related to a structured entity having a plurality of structurally interrelated parts, one or more sets of response templates 910*a-n*, and a plurality of controls 931-936.

In operation, the complex query 810 is interpreted to be a query that must be satisfied by a response that addresses a plurality of structurally interrelated parts. Thus, a plurality of response templates 910*a* (1-n) may be presented to a user of the client device 720. For example, in responding to the complex query 810 of "Describe the steps in producing an electrolyte solution", a student may have to fill in a plurality of response templates, where each response template describes a step in producing the electrolyte solution.

The display 900 also illustrates the display of response templates 910*n* from other individuals, e.g., other students, the instructor or an aggregated result. Namely, a student has the ability to view how other students are answering the complex query. This function can be activated by depressing or clicking the look control 934. However, since it is important to allow the student to tackle the query first, the instructor may block the "look" function by activating the "freeze" function on the aggregating device 710 such that the student is unable to see other response templates until the student is done with submitting his or her responses.

Again, controls 922 can be implemented within the response templates to allow the user to navigate through the set of response templates. Alternatively, "virtual" controls, buttons or menus 931-937 can be displayed within display 900. Specifically, previous control 931 allows a user to select a previous frame. Next control 932 allows a user to select a next frame. Send control 933 allows a user to send data to the aggregating device 710, e.g., sending a response template or a set of response templates to the aggregating device 710. Look control 934 allows a user to look at data, e.g., to look at a particular response template from another individual. Review control 935 allows a user to review his own work, e.g., to review the entire set of response templates before forwarding the response templates to another student or the instructor. Save control 936 allows a user to save data, e.g., response templates, aggregated results, queries and so on. Enter control 937 allows a user to enter ancillary information or tags, e.g., tags that identify a student name, a student number, a class number, a grade level, a school number and so on. It should be noted that although controls 931-937 are presented as virtual controls, these controls can be implemented as physical buttons of the client device 720. It should also be noted that virtual controls such as "previous" and "next" are appropriate for structured entities that are sequential in nature. Other virtual controls such as "Zoom In", "Zoom Out", "Front" and "Back" may be appropriate for layered structured entities.

Figure 10:
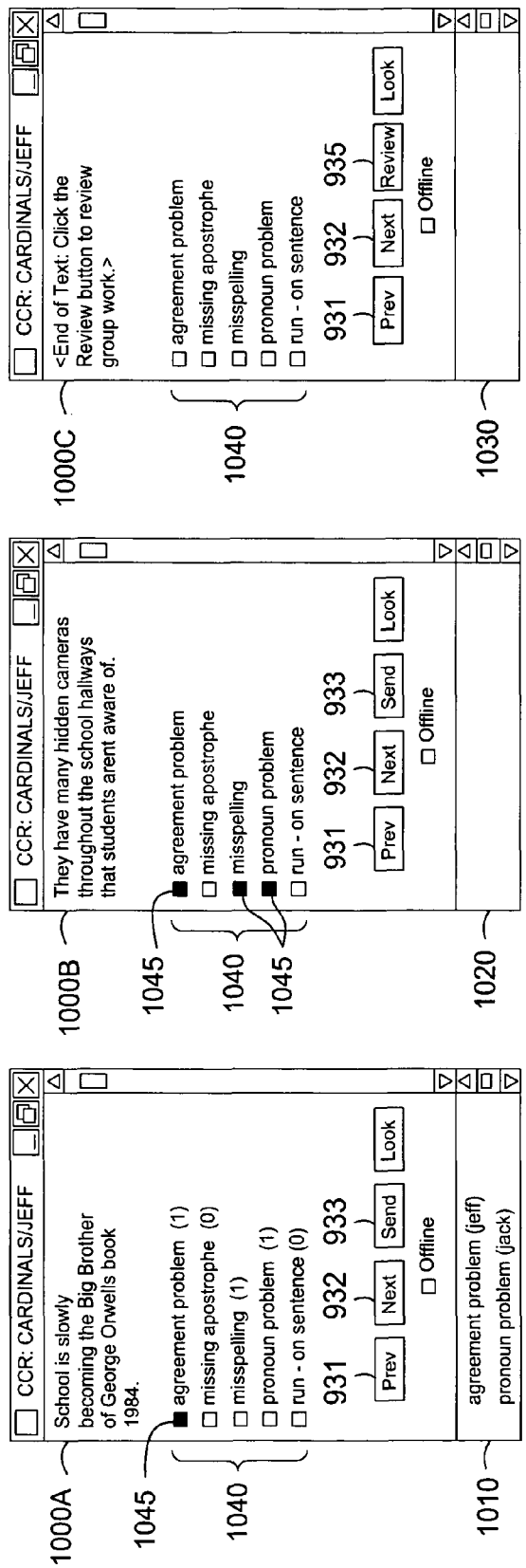
FIG. 10 illustrates a set of exemplary response templates of the present invention.

FIG. 10 illustrates a set of exemplary response templates 1010-1030. The response templates are related to a complex query that addresses a literary passage. For example, this passage is divided into a plurality of structurally interrelated parts 1000a and 1000b, each part is separately presented on the display module of the student client device 720 in the display 900. The students can navigate between each of the parts that comprise the literary passage by pressing the "previous" 931 and "next" buttons 932. Each of the interrelated parts is paired to one of the response templates 1010-1020 comprising a predetermined list of grammatical deficiencies 1040. The students are presented with the complex query, "For each of the portions of the passage, indicate one or more grammatical deficiencies that are present." Response templates are then provided for each portion of the passage.

Alternatively, the entire passage can be presented to the user with the relevant portion(s) being highlighted for a particular response template. As the students navigate through the complex query, different portions of the passage will be highlighted.

A student performing his exercise would first likely read through the entire passage, by means of utilizing their navigational device 720 so that he could attempt to comprehend the broader significance of the complex query 810.

The student may answer the complex query by providing responses in the response templates 1010-1020. Specifically, the darkened squares 1045 indicate which of the pre-determined list of grammatical deficiencies that each student has selected. Once the students have completed their responses to this set of templates, they click the "send" button 933 that will transmit the response back to the aggregating device 710. Once the students have made their submissions for this corresponding part, the instructor can view the student responses pertaining to this response on the display 800 by pressing the "Look" button 838. The instructor can utilize the display to review and assess student comprehension of each of the interrelated parts, and can thereby provide meaningful, rapid feedback to the students. Once the student submissions are completed, the students can click on the "Review" button 935 so that they can review and assess different student understandings of the interrelated parts.

Figure 11:
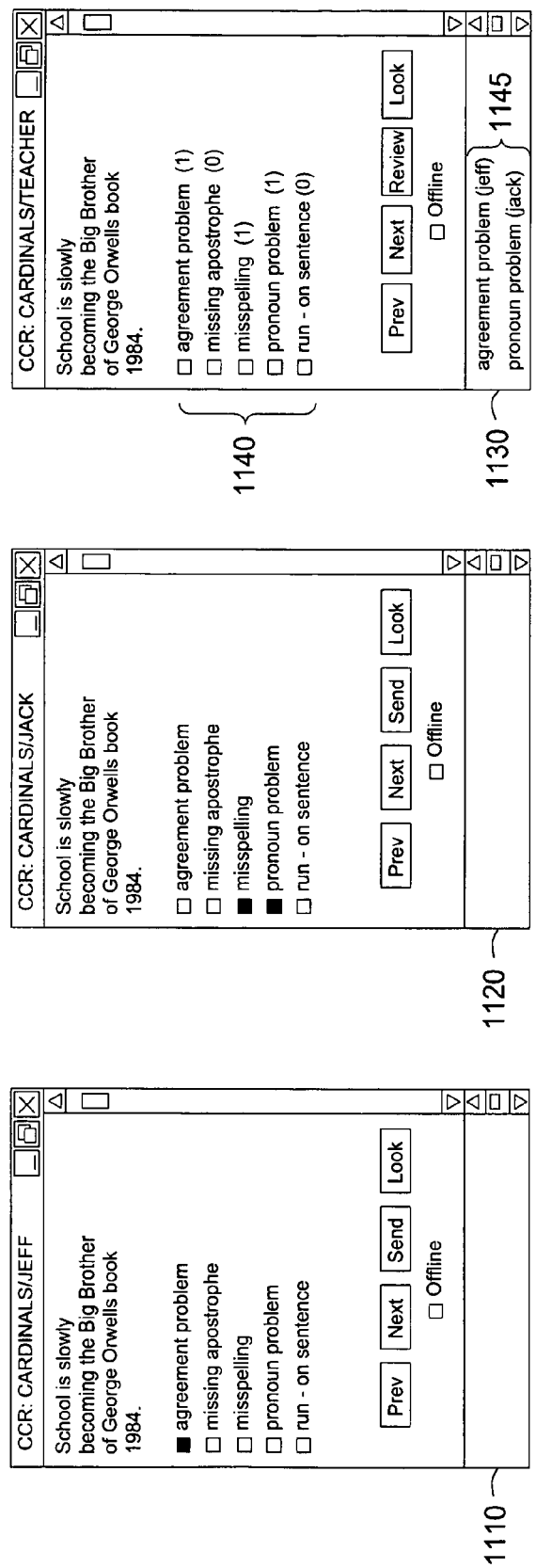
FIG. 11 illustrates a set of exemplary response templates and a summary template of the present invention.

FIG. 11 illustrates a set of exemplary response templates 1110-1120 and a summary template 1130. For example, FIG. 11 illustrates the templates that may be presented to a student upon the students' execution of the "Review" function or button 935. As per the aspect of the invention described above, the students in this embodiment cannot review their work until they have completed their transmissions. When the students select the "Review" function 935, they can see the query/response display 900 wherein the query 810 is presented in conjunction with their own response templates 1110 (e.g., Jeff), as well as the results of the other students 1120 (e.g., Jack).

Finally, FIG. 11 also illustrates a summary template 1130 that indicates the aggregated results 1140 of all the student responses pertaining to the complex query. For example, summary template 1130 indicates that for the part of the passage "School is slowly becoming the Big Brother of George Orwells book 1984.", there is one response template that indicates the passage had agreement problem, one response template that indicates the passage had misspelling, and one response template that indicates the passage had pronoun problem. Furthermore, the summary template also indicates the specific response provided by each student 1145. It should be noted that the information illustrated in FIG. 11 can be viewed on the client device 720 and the aggregating device 710.

Alternatively, the aggregate function can be implemented such that it can provide a single template that shows statistics on how the group responded. For example, next to each "tag", hyperbole, there could be a number indicating how many students selected that tag for that particular sentence. Alternatively, there could be a histogram-bar graph or a pie chart drawn from each tag, thereby showing the relative proportion. One advantage of the aggregation function is to pull together the pattern of the group response, not just to simultaneously browse related individual responses.

Figure 12:
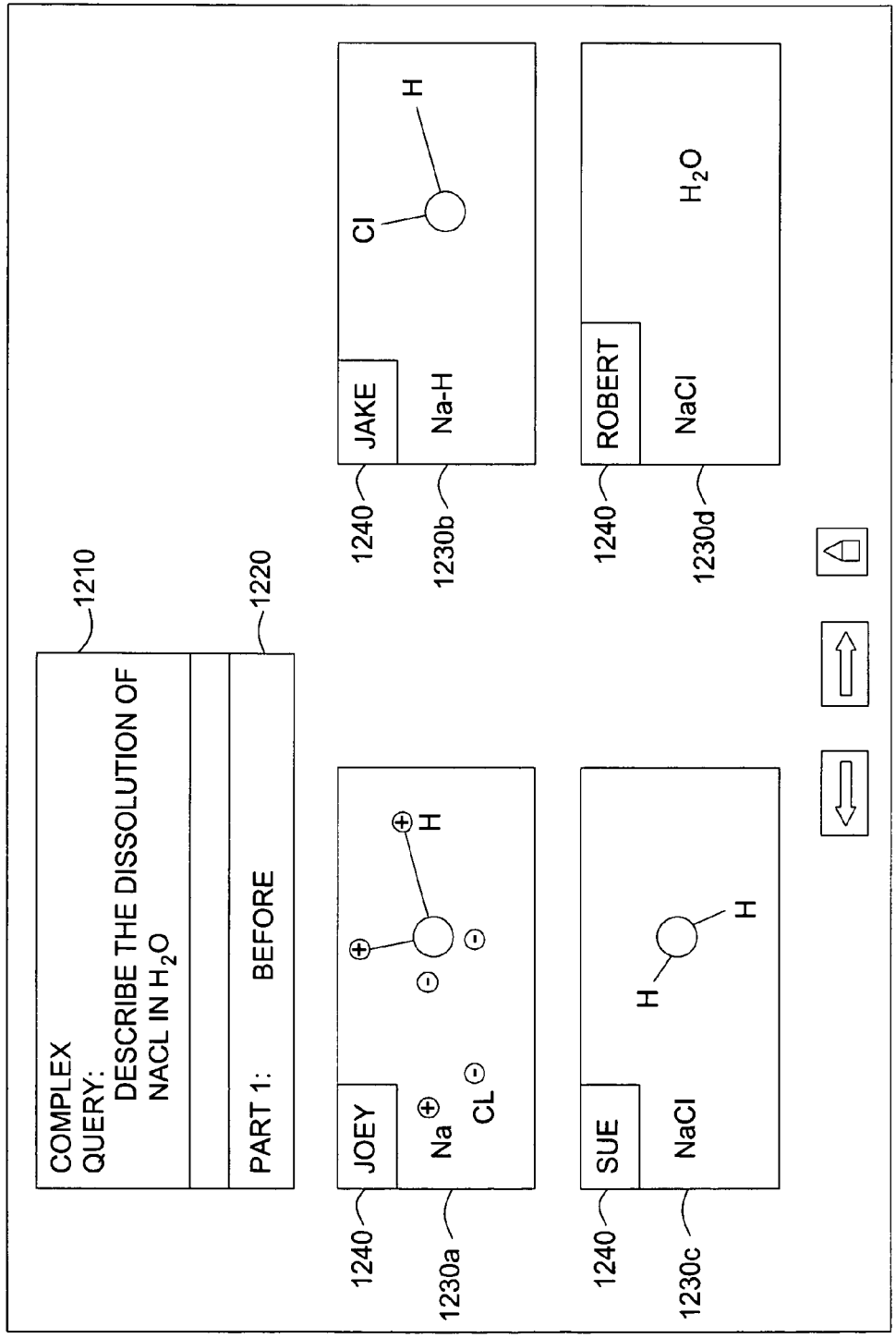
FIG. 12 illustrates an instructor display presenting a complex query and one of its interrelated parts of the complex query and a plurality of student responses.

FIG. 12 illustrates an instructor display 1200 presenting a complex query 1210 and one of its interrelated parts 1220 of the complex query and four student responses 1230a-d. This display can be presented to a user of the aggregating device 710. For example, the instructor may utilize an aspect of the aggregator 710 to select four specific student responses based upon the ancillary tag of their names 1240. The instructor can compare and contrast these results, as well as to navigate between the different stages 1220 to review and assess student comprehension of each of the interrelated parts, and can thereby provide meaningful, rapid feedback to the students.

The present invention provides a method and a system for assessing a student's understanding of a process that may unfold, e.g., over time and space, thereby encouraging a learner to explain a complex concept in a step-by-step fashion. To demonstrate this approach, several examples of complex queries are provided below.

In one embodiment, the complex query can comprise instructions to pictorially express a molecular process beforestage, during-stage and after-stage, whereby at least one response template is provided for each respective stage. In one example, students are provided with the complex query, "Draw pictures that explain the process you understand to occur, at the molecular level, before, during, and after salt dissolves in water." Response templates are provided for the appropriate stages.

In another embodiment, the query comprises instructions to identify one or more lines of a poem corresponding to each one of a plurality of literary devices that contribute to a literary effect, whereby at least one response template is provided for each literary device. In one example, students are provided with twelve lines of poetry and the complex query, "Identify the words, phrases, or stanzas that you believe demonstrate alliteration, onomatopoeia and rhyme and explain the rationale behind the use of the respective devices in the context of this poem." Response templates are provided for each literary device.

In another embodiment, the complex query comprises instructions to justify and explain each stage of a multi-step transformative process selected from the group comprising a mathematical proof, a logical proof, a chemical reaction pathway or a biological reaction pathway, whereby at least one response template is provided for each respective stage. In an example, students are provided with eight lines of a geometric proof with instructions "Beside each step of the proof, explain why you believe that step is justified, drawing upon the table of reasons provided to you in table 1." Response templates are provided for each step of the proof.

In another embodiment, the complex query comprises instructions to provide data input corresponding to each missing stage of a multi-step transformative process such as the ones described above, given sufficient information about or explanation of this process, whereby at least one response template is provided for each respective stage. In an example, students are provided with the initial reactant and final product with the complex query, "Draw the intermediate chemical products and appropriate justification that enable you to reach the final product in three steps, given the initial reactant." Response templates are provided for each of the intermediate steps.

In another embodiment, the complex query comprises instructions to identify and explain the correct piece of computer code and/or computational state corresponding to each described stage of a computer algorithm, whereby at least one response template is provided for each respective stage.

In another embodiment, the complex query comprises instructions to identify a part of a multi-part biological organism, whereby at least one response template is provided for each respective part. In an example, students are presented with a sequence of pictures of a frog, beginning with the entire frog, then a picture of the frog's lungs, then a picture of a given tissue inside the lungs of a frog and then a picture of a specialized type of cell contained within the lungs. The students are provided with the query, "Given what you know about how a frog respirates, identify each level of structure and describe how the unique features of each level of structure that enables the frog to breathe." Response templates are provided for each level of the organism.

In another embodiment, the complex query comprises instructions to identify the role of one or more parts in said multi-part composition, whereby at least one template is provided for each respective part. In an example, students are presented with a selection from a multi-instrumental musical score whereby the student could view and/or listen to the entire selection or to different instrumental parts individually. The students are then be provided with the complex query, "Identify the musical function that is performed by each of the parts that comprise this selection and explain your rationale." Response templates are provided for each of the instrumental parts.

In another embodiment, the complex query comprises instructions to identify the function of one or more parts of a multi-part architectural structure, whereby at least one template is provided for each respective part. In an example, students are presented with a three-dimensional rendering of a house, with present view points for the camera that direct attention to particular features such as the roofline and the floor plan. The students are provided with the complex query, "For the selected features of the house, describe the role that each plays in the overall composition." Response templates are provided for each feature of the house.

It should be noted that each of the above examples illustrates how the response templates can be used relative to the structured entity, but the templates are not so limited. Namely, one template may have multiple "tags" (e.g. a whole palette of different literary devices, or of possible explanations of proof steps, or molecular icons). Thus, it is not necessary that students respond to each and every part of the structured entity. In the most general form, the student can pick which template to use for each part of their response and how may templates together form their response. It could be that their composite response is only one (1) template indexing one feature of the entity. Alternatively, it could be that their response has two (2) templates of one kind (e.g., tag-like descriptors) and one (1) template of another kind (e.g., proof-reader annotation marks) indexing three (3) features. In turn, the teacher might be allowed to set certain constraints, e.g., requiring exactly n templates, requiring specific templates, or requiring that the templates index specific features.

One advantage of the present invention is that it is designed to allow flexibility to the teacher and the students. The teacher has the option to specify a particular response pattern as the correct answer or the teacher can simply allow the student to formulate their own answers by choosing the relevant templates and the response indices.

Several optional functions or features can be added to the present invention. For example, at least one additional part is provided without a response template, whereby this part is provided as a means of reference for the students to better understand the complex structure. Namely, part of a complex process or part of a complex structure can be provided to the student.

Additionally, the response template can be optionally restricted by the instructor to a pre-defined set of inputs. This is illustrated in FIG. 10.

Additionally, the aggregating device contains a scoring agent or application that aggregates the responses and tallies the percentages of students submitting the respective responses. Namely, the aggregated result can be presented in different types of measures. These aggregated results can be displayed on the aggregating device 710 and/or the client devices 720.

Additionally, the student data-input responses to the queries are unrestricted. Namely, the student can provide any responses, e.g., writing a response in text, drawing a picture, writing a series of equations, writing pseudo-codes and so on. This is illustrated in FIG. 12.

In one embodiment, the student client device 720 is configured such that information input device comprises a handheld graphical data-input device 726 such as a mouse, whereby the client device 720 is capable of transforming movement of this input device into bitmap images and a control portion for enabling student to transmit the input.

In another embodiment, the handheld device 720 is configured such that information input device includes a touch-screen input arrangement, whereby the client device is capable of transforming student data input into bitmap images and a control portion for enabling student to transmit the input.

In another embodiment, the handheld device 720 is configured such that information input device includes a microphone for receiving audible input from a student, the student input device 720 performing a speech recognition operation in connection therewith to generate information content in response to the audible input, the student input device generating the response message and a control portion for enabling student to transmit the input.

Figure 13:
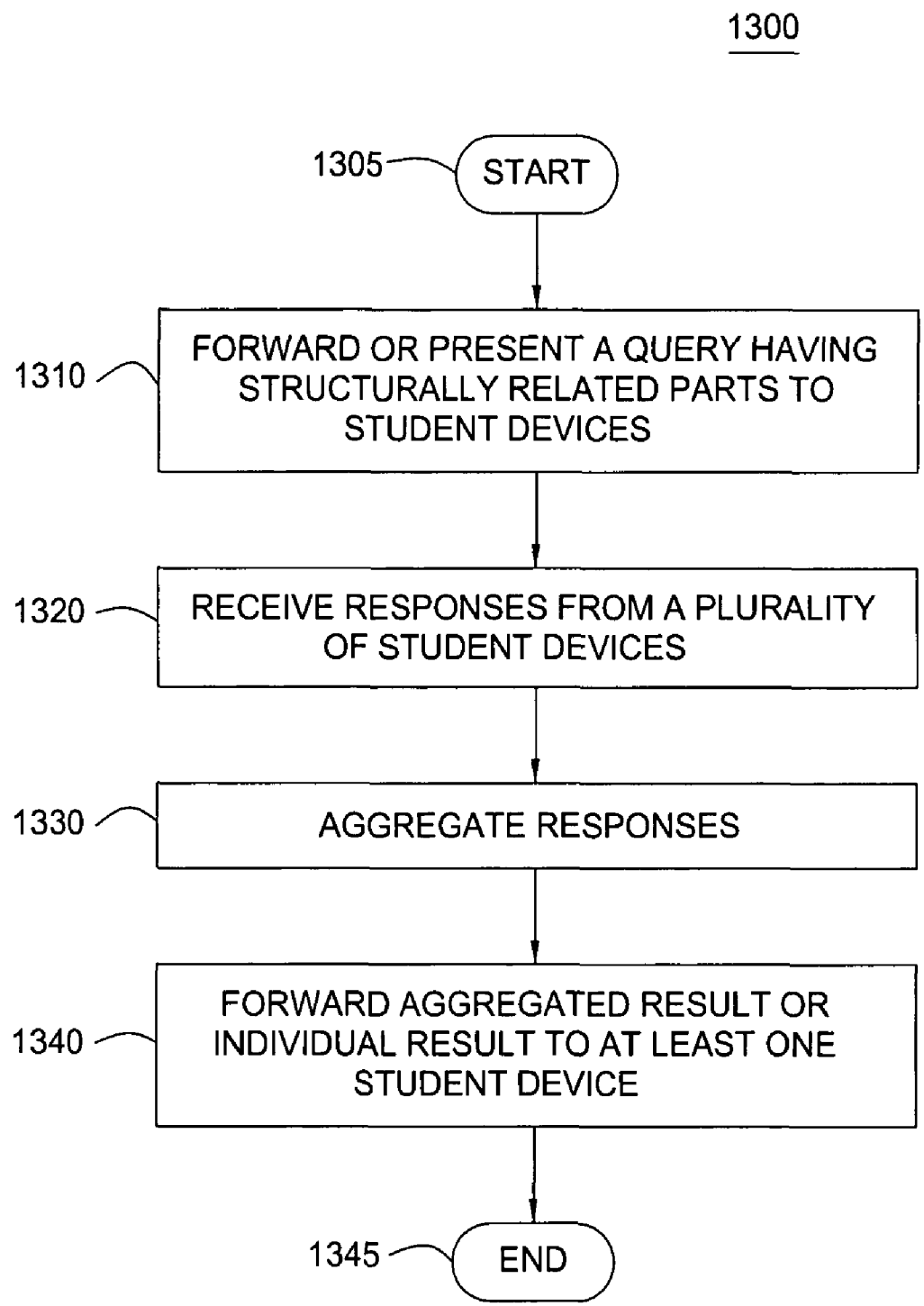
FIG. 13 illustrates a flowchart of a method for forwarding a complex query to a client device.

FIG. 13 illustrates a flowchart 1300 of a method for forwarding a complex query to a client device. Namely, FIG. 13 illustrates the present method for assessing a student's understanding of a complex process from the perspective of the aggregating device 710. Method 1300 starts in step 1305 and proceeds to step 1310.

In step 1310, method 1300 forwards a complex query related to a structured entity having a plurality of related parts. Namely, the complex query is interpreted to be a query that must be satisfied by a response that addresses a plurality of structurally interrelated parts.

In step 1320, method 1300 receives responses from a plurality of client devices. In one embodiment, the responses are in the form of response templates, where each response template relates to a part of said structured entity.

In step 1330, method 1300 aggregates the responses. Specifically, the response templates are grouped to evaluate the responses provided by the students. For example, the aggregated result may comprise a statistical grouping of the responses, e.g., how many responses (or the percentage of responses) selected choice "A" and so on.

In step 1340, method 1300 may optionally forward the aggregated result or individual responses to one or more client devices 720. Method 1300 then ends in step 1345.

Figure 14:
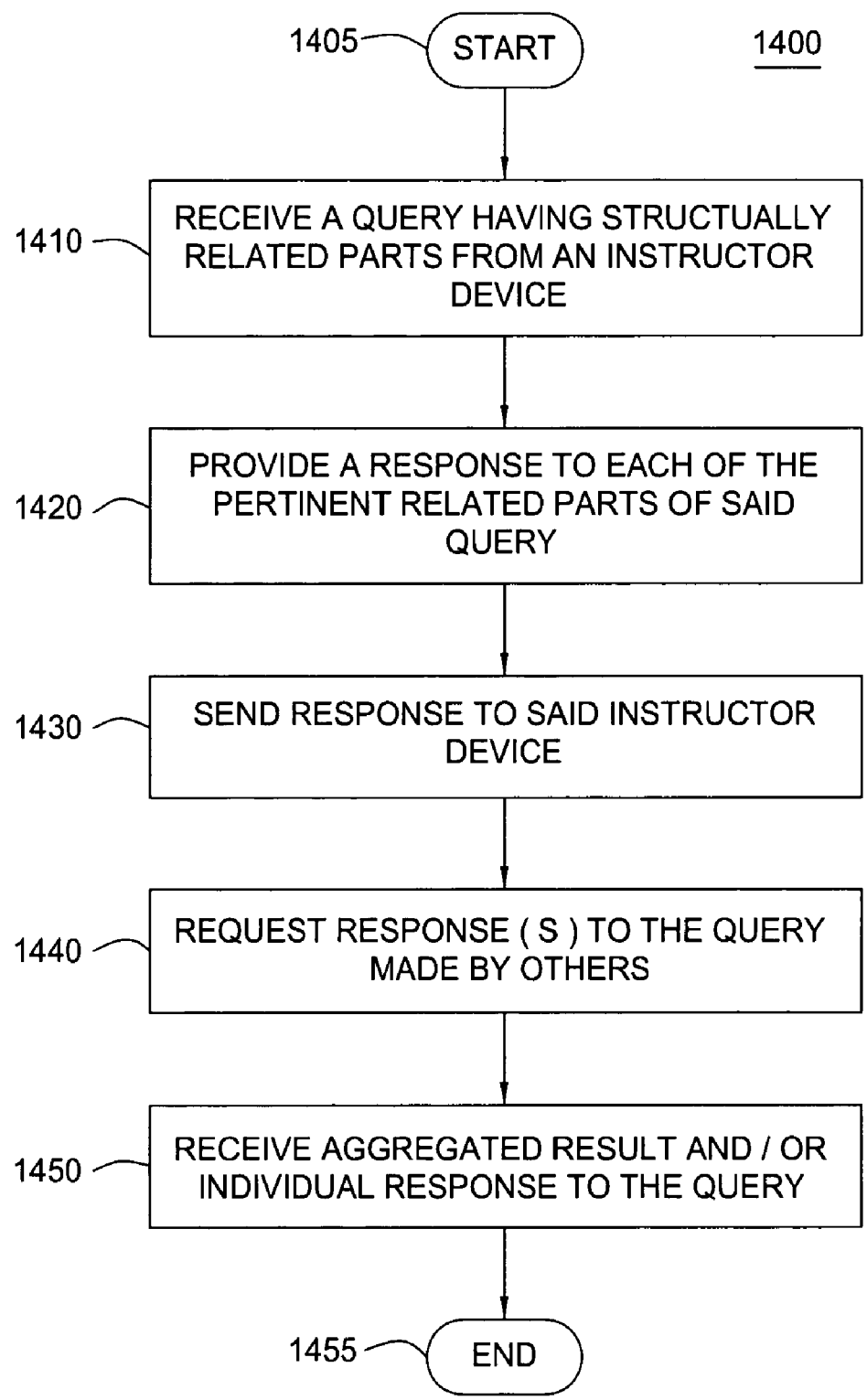
FIG. 14 illustrates a flowchart of a method for receiving a complex query from an aggregating device.

FIG. 14 illustrates a flowchart 1400 of a method for receiving a complex query from an aggregating device. Namely, FIG. 14 illustrates the present method for answering a complex query from the perspective of the client device 720. Method 1400 starts in step 1405 and proceeds to step 1410.

In step 1410, method 1400 receives a complex query related to a structured entity having a plurality of related parts. Namely, the complex query is interpreted to be a query that must be satisfied by a response that addresses a plurality of structurally interrelated parts.

In step 1420, method 1400 provides a response to each of the pertinent related parts of the complex query. For example, a response template is generated or simply answered if provided by the aggregating device for each related parts of the complex query, e.g., selecting an answer from a set of multiple choices.

In step 1430, method 1400 sends responses to the aggregating or instructor client device 710. In one embodiment, the responses are in the form of response templates, where each response template relates to a part of said structured entity. The response templates can be sent individually or as a set of response templates for each complex query.

In step 1440, method 1400 optionally requests response(s) from other individuals or an aggregated result. Namely, a user of the client device 720 may desire to view answers provided by others or the instructor.

In step 1450, method 1400 receives response(s) from other individuals or an aggregated result from the aggregating device 710. Alternatively, if permitted, the response templates can also be directly received from another client device 720. Method 1400 then ends in step 1455.

Although the complex query and the structured entities are disclosed above as being forwarded to the client devices from the aggregating device, the present invention is not so limited. It is possible that the complex query and the structured entities are loaded from another device and the aggregating device simply triggers the querying process where certain complex queries and structured entities are loaded into the memory of the client devices.

The present invention addresses a major need in science instruction where it is necessary to assess a student's understanding of a process that unfolds over time or space. In many cases, such a process cannot be adequately represented to the student in a single image. Further, a textual narrative of the process often fails to be an adequate presentation for the student to respond to. There is a need to present students with a stimulus that is a representation of a process in multiple related parts, and gather their respond to that stimulus in a way that indexes the given representation directly (as students often have trouble re-describing a particular process step or part in words).

One kind of response from the student is to indicate order in time among a set of images that represent a process, but are not already presented in time sequence. For example, students might order the events in the growth of a plant from seed to flower by arranging a set of images into a movie. Additional examples of processes for which there is a need to gather evidence of student understanding include: cell mitosis, cell meiosis, earth system processes, succession in a forest ecosystem, likely path of hurricanes, geologic timescales and so on.

Various kinds of responses that are believed to be useful to analyze as evidence of student understanding include:
1) A response where a student identifies the step in which a particular aspect of the process occurs (e.g. where the cell is replicating RNA).
2) A response where the student modifies an existing sequence of events to indicate what would happen ("what if") a novel event is introduced in an earlier stage.
3) A response where the student is asked to "fill in" what happen before, in a missing intermediate stage, or after the presented sequence of events.
4) A response where the student allocates time (duration) to particular phases of a process (e.g. in a movie about the evolution of mammals, in what portion of time have humans existed?).
5) A response where the student explains (either verbally or by sketching) what happens in a particular process step by virtue of an annotation that references that step.

Using the present invention, these complex responses can be easily implemented.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing feedback, said method comprising:
   a) forwarding a query pertaining to a structured entity having a plurality of parts;
   b) forwarding a plurality of response templates for answering the query; and
   c) receiving a first response from a first client device that addresses all of the plurality of parts of the structured entity, wherein said first response comprises a first set of one or more completed response templates selected from the plurality of response templates, the first set indexing one or more of said plurality of parts of said structured entity in a manner that is chosen by a user of the first client device, wherein the user of the first client device decides which of the plurality of response templates to use in the first set and how many of the plurality of response templates to use in the first set.

2. The method of claim 1, further comprising:
   d) receiving a second response from a second client device, wherein said second response comprises a second set of one or more completed response templates selected from the plurality of response templates, the second set indexing one or more of said plurality of parts of said structured entity in a manner chosen by a user of the second client device, wherein the user of the second client device decides which of the plurality of response templates to use in the second set and how many of the plurality of response templates to use in the second set.

3. The method of claim 2, further comprising:
   e) aggregating said first response and said second response to produce an aggregated result.

4. The method of claim 3, further comprising:
   f) forwarding said aggregated result to said first client device or said second client device.

5. The method of claim 4, wherein the aggregated result is forwarded to said first client device only after the first response is received and is forwarded to said second client device only after said second response is received.

6. The method of claim 2, further comprising:
   e) forwarding said first response to said second client device.

7. The method of claim 6, wherein the forwarding is performed only after the second response is received from the second client device.

8. The method of claim 2, wherein the first set of one or more completed response templates and the second set of one or more completed response templates include different templates selected from the plurality of templates.

9. The method of claim 1, wherein said structured entity comprises a sequential multi-step process.

10. The method of claim 9, wherein each template in the first set describes a step of the sequential multi-step process.

11. The method of claim 1, wherein said structured entity comprises a literary work or a portion of a literary work.

12. The method of claim 1, wherein said structured entity comprises a computer program.

13. The method of claim 1, wherein said structured entity comprises a musical composition.

14. The method of claim 1, wherein said structured entity comprises a biological organism.

15. The method of claim 1, wherein said structured entity comprises a computer data structure.

16. The method of claim 1, wherein said structured entity comprises an architectural structure.

17. The method of claim 1, wherein said structured entity comprises a chemical process.

18. The method of claim 1, wherein said first response contains an input entered by using said first client device.

19. The method of claim 18, wherein said input comprises filling in said at least one of the plurality of response templates.

20. The method of claim 18, wherein said input comprises linking said at least one of the plurality of response templates to at least one of said plurality of parts of said structured entity.

21. The method of claim 18, wherein said input comprises at least one tag.

22. The method of claim 1, wherein the plurality of response templates allows the user of the first client device to decide whether to form the first response as written text, as a drawn image, as an equation, or as code.

23. The method of claim 1, wherein any template in the plurality of response templates may be used, alone or in combination with other templates in the plurality of response templates, to respond to the query.

24. A method for providing feedback, said method comprising:
   a) receiving a query pertaining to a structured entity having a plurality of parts;
   b) receiving a plurality of response templates for answering the query; and
   c) providing a first response that addresses all of the plurality of parts of the structured entity to an aggregating device from a first client device, wherein said first response comprises a first set of one or more completed response templates selected from the plurality of response templates, the first set indexing one or more of said plurality of parts of said structured entity in a manner that is chosen by a user providing the first response, wherein the user providing the first response decides which of the plurality of set templates to use in the first response and how many of the plurality of set templates to use in the first response.

25. The method of claim 24, further comprising:
   d) providing a second response to the aggregating device from a second client device, wherein said second response comprises a second set of one or more completed response templates selected from the plurality of response templates, the second set indexing one or more of said plurality of parts of said structured entity in a manner chosen by a user providing the second response, wherein the user providing the second response decides which of the plurality of response templates to use in the second set and how many of the plurality of response templates to use in the second set.

26. The method of claim 25, further comprising:
   e) requesting an aggregated result of said first response and said second response from said first client device and said second client device.

27. The method of claim 26, further comprising:
   f) receiving said aggregated result.

28. The method of claim 25, further comprising:
   f) receiving said first response by said second client device.

29. The method of claim 24, wherein said structured entity comprises a sequential multi-step process.

30. The method of claim 24, wherein said structured entity comprises a literary work or a portion of a literary work.

31. The method of claim 24, wherein said structured entity comprises a computer program.

32. The method of claim 24, wherein said structured entity comprises a musical composition.

33. The method of claim 24, wherein said structured entity comprises a biological organism.

34. The method of claim 24, wherein said structured entity comprises a computer data structure.

35. The method of claim 24, wherein said structured entity comprises an architectural structure.

36. The method of claim 24, wherein said structured entity comprises a chemical process.

37. A non-transitory computer-readable medium having stored thereon a plurality of instructions, the plurality of instructions including instructions which, when executed by a processor, cause the processor to perform steps comprising:
   a) forwarding a query pertaining to a structured entity having a plurality of parts;
   b) forwarding a plurality of response templates for answering the query; and
   c) receiving a first response from a first client device that addresses all of the plurality of parts of the structured entity, wherein said first response comprises a first set of one or more completed response templates selected from the plurality of response templates, the first set indexing one or more of said plurality of parts of said structured entity in a manner that is chosen by a user of the first client device, wherein the user of the first client device decides which of the plurality of response templates to use in the first set and how many of the plurality of response templates to use in the first set.

38. The non-transitory computer-readable medium of claim 37, further comprising:
   d) receiving a second response from a second client device, wherein said second response comprises a second set of one or more completed response templates selected from the plurality of response templates, the second set indexing one or more of said plurality of parts of said structured entity in a manner that is chosen by a user of the second client device, wherein the user of the second client device decides which of the plurality of response templates to use in the second set and how many of the plurality of response templates to use in the second set.

39. The non-transitory computer-readable medium of claim 38, further comprising:
   e) aggregating said first response and said second response to produce an aggregated result.

40. The non-transitory computer-readable medium of claim 39, further comprising:
   f) forwarding said aggregated result to said first client device or said second client device.

41. The non-transitory computer-readable medium of claim 38, further comprising:
   e) forwarding said first response to said second client device.

42. The non-transitory computer-readable medium of claim 37, wherein said structured entity comprises a sequential multi-step process.

43. The non-transitory computer-readable medium of claim 37, wherein said structured entity comprises a literary work or a portion of a literary work.

44. The non-transitory computer-readable medium of claim 37, wherein said structured entity comprises a computer program.

45. The non-transitory computer-readable medium of claim 37, wherein said structured entity comprises a musical composition.

46. The non-transitory computer-readable medium of claim 37, wherein said structured entity comprises a biological organism.

47. The non-transitory computer-readable medium of claim 37, wherein said structured entity comprises a computer data structure.

48. The non-transitory computer-readable medium of claim 37, wherein said structured entity comprises an architectural structure.

49. The non-transitory computer-readable medium of claim 37, wherein said structured entity comprises a chemical process.

50. The non-transitory computer-readable medium of claim 37, wherein said first response contains an input entered by using said first client device.

51. The non-transitory computer-readable medium of claim 50, wherein said input comprises filling in said at least one of the plurality of response templates.

52. The non-transitory computer-readable medium of claim 50, wherein said input comprises linking said at least one of the plurality of response templates to at least one of said plurality of parts of said structured entity.

53. The non-transitory computer-readable medium of claim 50, wherein said input comprises at least one tag.

54. A non-transitory computer-readable medium having stored thereon a plurality of instructions, the plurality of instructions including instructions which, when executed by a processor, cause the processor to perform steps comprising:
   a) receiving a query pertaining to a structured entity having a plurality of parts;
   b) receiving a plurality of response templates for answering the query; and
   c) providing a first response that addresses all of the plurality of parts of the structured entity to an aggregating device from a first client device, wherein said first response comprises a first set of one or more completed response templates selected from the plurality of response templates, the first set indexing one or more of said plurality of parts of said structured entity in a manner that is chosen by a user providing the first response, wherein the user providing the first response decides which of the plurality of set templates to use in the first response and how many of the plurality of set templates to use in the first response.

55. The non-transitory computer-readable medium of claim 54, further comprising:
   d) providing a second response to the aggregating device from a second client device, wherein said second response comprises a second set of one or more completed response templates selected from the plurality of response templates, the second set indexing one or more of said plurality of parts of said structured entity in a manner that is chosen by a user of the second client device, wherein the user of the second client device decides which of the plurality of response templates to use in the second set and how many of the plurality of response templates to use in the second set.

56. The non-transitory computer-readable medium of claim 55, further comprising:
   e) requesting an aggregated result of said first response and said second response from said first client device and said second client device.

57. The non-transitory computer-readable medium of claim 56, further comprising:
   f) receiving said aggregated result.

58. The non-transitory computer-readable medium of claim 55, further comprising:
   f) receiving said first response by said second client device.

59. The non-transitory computer-readable medium of claim 54, wherein said structured entity comprises a sequential multi-step process.

60. The non-transitory computer-readable medium of claim 54, wherein said structured entity comprises a literary work or a portion of a literary work.

61. The non-transitory computer-readable medium of claim 54, wherein said structured entity comprises a computer program.

62. The non-transitory computer-readable medium of claim 54, wherein said structured entity comprises a musical composition.

63. The non-transitory computer-readable medium of claim 54, wherein said structured entity comprises a biological organism.

64. The non-transitory computer-readable medium of claim 54, wherein said structured entity comprises a computer data structure.

65. The non-transitory computer-readable medium of claim 54, wherein said structured entity comprises an architectural structure.

66. The non-transitory computer-readable medium of claim 54, wherein said structured entity comprises a chemical process.

67. An apparatus for providing feedback, said apparatus comprising:
   means for forwarding a query pertaining to a structured entity having a plurality of parts and for forwarding a plurality of response templates for answering the query; and
   means for receiving a first response from a first client device that addresses all of the plurality of parts of the structured entity, wherein said first response comprises a first set of one or more completed response templates selected from the plurality of response templates, the first set indexing one or more of said plurality of parts of said structured entity in a manner that is chosen by a user of the first client device, wherein the user of the first client device decides which of the plurality of response templates to use in the first set and how many of the plurality of response templates to use in the first set.

68. The apparatus of claim 67, wherein said means for receiving further receives a second response from a second client device, wherein said second response comprises a second set of one or more completed response templates selected from the plurality of response templates, the second set indexing one or more of said plurality of parts of said structured entity in a manner that is chosen by a user of the second client device, wherein the user of the second client device decides which of the plurality of response templates to use in the second set and how many of the plurality of response templates to use in the second set.

69. The apparatus of claim 68, further comprising:
means for aggregating said first response and said second response to produce an aggregated result.

70. The apparatus of claim 69, wherein said means for forwarding further forwards said aggregated result to said first client device or said second client device.

71. The apparatus of claim 68, wherein said means for forwarding further forwards said first response to said second client device.

72. An apparatus for providing feedback, said apparatus comprising:
means for receiving a query pertaining to a structured entity having a plurality of parts and for receiving a plurality of response templates for answering the query; and
means for providing a first response that addresses all of the plurality of parts of the structured entity to an aggregating device from a first client device, wherein said first response comprises a first set of one or more completed response templates selected from the plurality of response templates, the first set indexing one or more of said plurality of parts of said structured entity in a manner that is chosen by a user providing the first response, wherein the user providing the first response decides which of the plurality of set templates to use in the first response and how many of the plurality of set templates to use in the first response.

73. The apparatus of claim 72, further comprising:
means for requesting an aggregated result of said first response and a second response from a second client device.

74. The apparatus of claim 73, wherein said means for receiving further receives said aggregated result.

75. A system for providing feedback, said system comprising:
a first client device; and
an aggregating device for forwarding a query pertaining to a structured entity having a plurality of parts and a plurality of response templates for answering the query to said first client device, where said aggregating device receives a first response that addresses all of the plurality of parts of the structured entity from said first client device, wherein said first response comprises a first set of one or more completed response templates selected from the plurality of response templates, the first set indexing one or more of said plurality of parts of said structured entity in a manner that is chosen by a user of the first client device, wherein the user of the first client device decides which of the plurality of response templates to use in the first set and how many of the plurality of response templates to use in the first set.

\* \* \* \* \*